(12) United States Patent
Besaucele et al.

(10) Patent No.: US 7,741,639 B2
(45) Date of Patent: Jun. 22, 2010

(54) MULTI-CHAMBERED EXCIMER OR MOLECULAR FLUORINE GAS DISCHARGE LASER FLUORINE INJECTION CONTROL

(75) Inventors: Herve A. Besaucele, San Diego, CA (US); Wayne J. Dunstan, San Diego, CA (US); Toshihiko Ishihara, San Diego, CA (US); Robert N. Jacques, San Diego, CA (US); Fedor B. Trintchouk, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 1661 days.

(21) Appl. No.: 10/953,100

(22) Filed: Sep. 29, 2004

(65) Prior Publication Data

US 2005/0094698 A1 May 5, 2005

Related U.S. Application Data

(63) Continuation-in-part of application No. 10/631,349, filed on Jul. 30, 2003, now Pat. No. 7,039,086.

(51) Int. Cl.
*H01S 3/22* (2006.01)
(52) U.S. Cl. .............................. 257/55; 372/57; 372/58; 372/86
(58) Field of Classification Search .................. 372/55, 372/57, 58, 86
See application file for complete search history.

(56) References Cited

U.S. PATENT DOCUMENTS 4,223,279 A 9/1980 Bradford, Jr. et al. ...... 331/94.5

(Continued)

FOREIGN PATENT DOCUMENTS

WO WO 0124327 A1 * 4/2001

OTHER PUBLICATIONS

Burnett, Levine, Shirley & Bruning, "Symmetry of spatial-dispersion-induced birefringence and its implications of $CaF_2$ ultraviolet optics," J. Microlith., Micrysyst., vol. 1, No. 3, Oct. 2002.

(Continued)

*Primary Examiner*—Matthew E Warren

(57) ABSTRACT

A multi-chambered excimer or molecular halogen gas discharge laser system comprising at least one oscillator chamber and at least one amplifier chamber producing oscillator output laser light pulses that are amplified in the at least one power chamber, having a fluorine injection control system and a method of using same is disclosed, which may comprise: a halogen gas consumption estimator: estimating the amount of halogen gas that has been consumed in one of the at least one oscillator chamber based upon at least a first operating parameter of one of the least one oscillator chamber and the at least one amplifier chamber, and the difference between a second operating parameter of the at least one oscillator chamber and the at least one amplifier chamber, and estimating the amount of halogen gas that has been consumed in the other of the at least one oscillator chamber and the at least one amplifier chamber based upon at least a third operating parameter of the other of the at least one oscillator chamber and the at least one amplifier chamber, and producing an output representative of an estimated halogen gas consumption in the at least one oscillator chamber and of the halogen gas consumption in the at least one amplifier chamber, and a halogen gas injection controller determining the amount of halogen gas injection for the at least one oscillator chamber and the at least one amplifier chamber based upon the estimated fluorine consumption outputs from the fluorine consumption estimator and a cost function comprising a plurality of weighted injection decision determinations.

288 Claims, 3 Drawing Sheets

U.S. PATENT DOCUMENTS

| | | | | |
|---|---|---|---|---|
| 4,410,992 | A | 10/1983 | Javan | 372/32 |
| 4,455,658 | A | 6/1984 | Sutter et al. | 372/38 |
| 4,550,408 | A | 10/1985 | Karning et al. | 372/58 |
| 4,891,820 | A | 1/1990 | Rando et al. | 372/93 |
| 4,959,840 | A | 9/1990 | Akins et al. | 372/57 |
| 5,005,180 | A | 4/1991 | Edelman et al. | 372/57 |
| 5,023,884 | A | 6/1991 | Akins et al. | 372/57 |
| 5,025,445 | A | 6/1991 | Anderson et al. | 372/20 |
| 5,025,446 | A | 6/1991 | Kuizenga | 372/21 |
| 5,189,678 | A | 2/1993 | Ball et al. | 372/28 |
| 5,313,481 | A | 5/1994 | Cook et al. | 372/37 |
| 5,315,611 | A | 5/1994 | Ball et al. | 372/56 |
| 5,359,620 | A | 10/1994 | Akins | 372/58 |
| 5,416,391 | A | 5/1995 | Correa et al. | 318/558 |
| 5,448,580 | A | 9/1995 | Birx et al. | 372/38 |
| 5,471,965 | A | 12/1995 | Kapich | 123/565 |
| 5,771,258 | A | 6/1998 | Morton et al. | 372/57 |
| 5,835,520 | A | 11/1998 | Das et al. | 372/57 |
| 5,852,621 | A | 12/1998 | Sandstrom | 372/25 |
| 5,863,017 | A | 1/1999 | Larson et al. | 248/176.1 |
| 5,953,360 | A | 9/1999 | Vitruk et al. | 372/87 |
| 5,978,394 | A | 11/1999 | Newman et al. | 372/32 |
| 5,978,406 | A | 11/1999 | Rokni et al. | 372/58 |
| 5,982,800 | A | 11/1999 | Ishihara et al. | 372/57 |
| 5,991,324 | A | 11/1999 | Knowles et al. | 372/57 |
| 6,005,879 | A | 12/1999 | Sandstrom et al. | 372/25 |
| 6,014,398 | A | 1/2000 | Hofmann et al. | 372/60 |
| 6,016,325 | A | 1/2000 | Ness et al. | 372/38 |
| 6,018,537 | A | 1/2000 | Hofmann et al. | 372/25 |
| 6,028,880 | A * | 2/2000 | Carlesi et al. | 372/58 |
| 6,067,306 | A | 5/2000 | Sandstrom et al. | 372/38 |
| 6,067,311 | A | 5/2000 | Morton et al. | 372/57 |
| 6,094,448 | A | 7/2000 | Fomenkov et al. | 372/102 |
| 6,104,735 | A | 8/2000 | Webb | 372/37 |
| 6,128,323 | A | 10/2000 | Myers et al. | 372/38 |
| 6,151,349 | A * | 11/2000 | Gong et al. | 372/58 |
| 6,157,662 | A | 12/2000 | Scaggs et al. | 372/60 |
| 6,164,116 | A | 12/2000 | Rice et al. | 73/1.72 |
| 6,188,710 | B1 | 2/2001 | Besaucele et al. | 372/60 |
| 6,192,064 | B1 | 2/2001 | Algots et al. | 372/99 |
| 6,208,674 | B1 | 3/2001 | Webb | 372/57 |
| 6,208,675 | B1 | 3/2001 | Webb | 372/58 |
| 6,212,211 | B1 | 4/2001 | Azzola et al. | 372/33 |
| 6,219,368 | B1 | 4/2001 | Govorkov | 372/59 |
| 6,240,117 | B1 | 5/2001 | Gong et al. | 372/58 |
| 6,243,405 | B1 | 6/2001 | Borneis et al. | 372/57 |
| 6,314,119 | B1 | 11/2001 | Morton | 372/57 |
| 6,317,447 | B1 | 11/2001 | Partlo et al. | 372/57 |
| 6,330,261 | B1 | 12/2001 | Ishihara et al. | 372/38.1 |
| 6,359,922 | B1 | 3/2002 | Partlo et al. | 372/58 |
| 6,381,257 | B1 | 4/2002 | Ershov et al. | 372/57 |
| 6,396,856 | B1 | 5/2002 | Sucha et al. | 372/25 |
| 6,414,979 | B2 | 7/2002 | Ujazdowski et al. | 372/87 |
| 6,466,365 | B1 | 10/2002 | Maier et al. | 359/355 |
| 6,477,193 | B1 | 11/2002 | Oliver et al. | 372/58 |
| 6,493,364 | B1 | 12/2002 | Baumler et al. | 372/15 |
| 6,493,370 | B2 | 12/2002 | Albrecht et al. | 372/58 |
| 6,532,247 | B2 | 3/2003 | Spangler et al. | 372/57 |
| 6,535,531 | B1 | 3/2003 | Smith et al. | 372/25 |
| 6,538,737 | B2 | 3/2003 | Sandstrom | 356/333 |
| 6,560,254 | B2 | 5/2003 | Stamm | 372/32 |
| 6,567,450 | B2 | 5/2003 | Myers et al. | 372/55 |
| 6,625,191 | B2 | 9/2003 | Knowles et al. | 372/55 |
| 6,671,294 | B2 | 12/2003 | Kroyan et al. | 372/20 |
| 6,687,562 | B2 | 2/2004 | Patel et al. | 700/121 |
| 6,690,704 | B2 | 2/2004 | Fallon et al. | 372/58 |
| 6,721,340 | B1 | 4/2004 | Fomenkov et al. | 372/25 |
| 6,750,972 | B2 | 6/2004 | Sandstrom et al. | 356/454 |
| 6,757,316 | B2 | 6/2004 | Newman et al. | 372/57 |
| 6,795,474 | B2 | 9/2004 | Partlo et al. | 372/57 |
| 6,798,812 | B2 | 9/2004 | Rylov et al. | 372/55 |
| 6,801,560 | B2 | 10/2004 | Knowles et al. | 372/55 |
| 6,987,790 | B2 | 1/2006 | Govorkov et al. | 372/86 |
| 2002/0048288 | A1 | 4/2002 | Kroyan et al. | 372/20 |
| 2002/0162973 | A1 | 11/2002 | Cordingley et al. | 250/492.2 |
| 2002/0167975 | A1 | 11/2002 | Spangler et al. | 372/20 |
| 2003/0099269 | A1 | 5/2003 | Ershov et al. | 372/55 |
| 2003/0118072 | A1 | 6/2003 | Wittak et al. | 372/58 |

* cited by examiner

MULTI-CHAMBERED EXCIMER OR MOLECULAR FLUORINE GAS DISCHARGE LASER FLUORINE INJECTION CONTROL

RELATED APPLICATIONS

The present application is a continuation-in-part of co-pending application Ser. No. 10/631,349, entitled CONTROL SYSTEM FOR A TWO CHAMBER GAS DISCHARGE LASER, filed on Jul. 30, 2003, and of Ser. No. 10/356,168, entitled AUTOMATIC GAS CONTROL SYSTEM FOR A GAS DISCHARGE LASER, filed on Jan. 31, 2003, and is related to Ser. No. 10/740,659, entitled METHOD AND APPARATUS FOR CONTROLLING THE OUTPUT OF A GAS DISCHARGE MOPA LASER SYSTEM, filed on Dec. 18, 2003, and Ser. No. 10/789,328, entitled PLANE MODEL FOR IMPROVED BANDWIDTH ESTIMATION filed on Feb. 27, 2004, and Ser. No. 10/609,223, entitled METHOD AND APPARATUS FOR MEASURING BANDWIDTH OF AN OPTICAL SPECTRUM OUTPUT OF A VERY SMALL WAVELENGTH VERY NARROW BANDWIDTH HIGH POWER LASER, and U.S. Pat. No. 5,887,014, entitled PROCESS FOR SELECTING OPERATING RANGE FOR NARROW BAND EXCIMER LASER, issued to Das on Mar. 23, 1999, each of which is assigned to the common assignee of the present invention and the disclosures of each of which is incorporated herein by reference.

FIELD OF THE INVENTION

The present invention relates to multi-chambered excimer or molecular fluorine gas discharge laser systems configured with at least one oscillator chamber and at least one amplifier chamber, with the output of the oscillator chamber amplified in the amplifier chamber, e.g., a master oscillator-power amplifier ("MOPA") configuration fluorine injection control apparatus and method.

BACKGROUND OF THE INVENTION

The above referenced co-pending applications discuss controlling the fluorine injection into separate chambers of a multi-chambered excimer or molecular fluorine gas discharge laser system separately for each chamber and to use signals representative of voltage applied to one or both chambers, the energy output of an oscillator chamber and bandwidth as part of some control function. However, as useful as these systems are, improvements are needed to better utilize laser system parameters that relate to fluorine consumption to perform such control and the present application deals with these improvements.

SUMMARY OF THE INVENTION

A multi-chambered excimer or molecular halogen gas discharge laser system comprising at least one oscillator chamber and at least one amplifier chamber producing oscillator output laser light pulses that are amplified in the at least one power chamber, having a fluorine injection control system and method of operating same is disclosed which may comprise a halogen gas consumption estimator: estimating the amount of halogen gas that has been consumed in one of the at least one oscillator chamber and amplifier chamber based upon at least a first operating parameter of one of the least one oscillator chamber and the at least one amplifier chamber, and the difference between a second operating parameter of the at least one oscillator chamber and the at least one amplifier chamber, and estimating the amount of halogen gas that has been consumed in the other of the at least one oscillator chamber and the at least one amplifier chamber based upon at least a third operating parameter of the other of the at least one oscillator chamber and the at least one amplifier chamber, and producing an output representative of an estimated halogen gas consumption in the at least one oscillator chamber and of the halogen gas consumption in the at least one amplifier chamber, and a halogen gas injection controller determining the amount of halogen gas injection for the at least one oscillator chamber and the at least one amplifier chamber based upon the estimated fluorine consumption outputs from the fluorine consumption estimator and a cost function comprising a plurality of weighted injection decision determinations. The first operating parameter may be the bandwidth pulse energy of the output pulses of the at least one amplifier chamber; the second operating parameter may be representative of the time of firing of the gas discharges in the at least one oscillator chamber and the at least one amplifier chamber; the third operating parameter may be the energy of the output pulses of the at lest one oscillator chamber. The halogen gas may be fluorine.

The estimating of the fluorine consumption in the at least one oscillator chamber may be carried out according to the formula: $\alpha \hat{CF}_2^{MO}(dtMOPA)+(1-\alpha)\ \hat{CF}_2^{MO}(E95)=\hat{CF}_2^{MO}$ and the estimating of the fluorine consumption in the at least one amplifier chamber may be carried out according to the formula: $\alpha \hat{CF}_2^{PA}(V)+(1-\alpha)\hat{CF}_2^{PA}(E_{MO})=\hat{CF}_2^{PA}$. These estimates of consumption of $F_2$ in either or both of the MO and PA may be compared to some reference value, e.g., to a measurement of the last inject of $F_2$ to the respective chamber, a value set after some time period or some number of shots, or a combination of both, e.g., representative of duty cycle, or imposed by some other design specification of the system.

The cost function may comprise: if $\hat{CF}_2^{MO} > \hat{CF}_2^{PA}$ then prefer oscillator injection=A; and if $\hat{CF}_2^{PA} > \hat{CF}_2^{MO}$ then prefer amplifier injection=A' and if bandwidth>a selected limit then prefer oscillator injection=B; and if bandwidth<a selected limit then prefer oscillator injection=C and if voltage supplied to the at least one amplifier chamber>a selected limit then prefer amplifier injection=D; and if voltage supplied to the at least one amplifier chamber<a selected limit then prefer amplifier injection=E. A may be=A'<B <D<C <E. The fluorine injection controller may implement a fluorine injection based upon the weighted injection decision determination with the highest score.

The method and apparatus may comprise: a halogen gas consumption estimator: estimating the amount of halogen gas that has been consumed in one of the at least one oscillator and at least one amplifier chamber based upon the difference between an operating parameter of the at least one oscillator chamber and the at least one amplifier chamber, and estimating the amount of halogen gas that has been consumed in the other of the at least one oscillator chamber and amplifier chamber, and producing an output representative of an estimated halogen gas consumption in the at least one oscillator chamber and in the at least one amplifier chamber. The operating parameter may be the timing of the gas discharge in the respective ones of the at least one oscillator chamber and the at least one amplifier chamber. The method and apparatus may comprise a halogen gas consumption estimator estimating the amount of halogen gas that has been consumed in one of the at least one oscillator and at least one amplifier chamber based upon an operating parameter of the other of the at least one oscillator chamber and the at least one amplifier chamber, and estimating the amount of halogen gas that has been consumed in the other of the at least one oscillator chamber and amplifier chamber, and producing an output representative of an estimated halogen gas consumption in the at least one oscillator chamber and in the at least one amplifier chamber. The operating parameter may be E95. The method and apparatus may comprise a halogen gas consumption estimator estimating the amount of halogen gas that has been consumed in each of the at least one oscillator chamber and the at least one amplifier chamber, based upon at least one parameter indicative of an amount of halogen gas consumption in the at least one oscillator chamber and at least one parameter indicative of an amount of halogen gas consumption in the at least one amplifier chamber and producing an output representative of the halogen gas consumption of the at least one oscillator chamber and an output representative of the halogen gas consumption of the at least one amplifier chamber. The at least one operating parameter indicative of the halogen gas consumption in the at least one oscillator chamber may be at least two operating parameters, the first of which is a difference in an operating parameter of the at least one oscillator chamber and the at least one amplifier chamber, and the second of which is an operating parameter of the at least one amplifier chamber, and the at least one operating parameter indicative of the halogen gas consumption in the at least one amplifier chamber may be at least two operating parameters one of which is an operating parameter of the at least one oscillator chamber and one of which is an operating parameter of the at least one amplifier chamber. The cost function may comprise a decision having a first weighting factor to inject halogen gas into the at least oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor. The other weighted injection decision determinations may be selected from the group of whether the bandwidth is out of specification high or low within a range of bandwidths and whether the voltage is out of specification, high or low, within a range of voltages, or other parameters. The estimating of the halogen gas consumption may be based upon a measured change in an operating parameter correlated to an empirically determined change in halogen gas content in a respective one of the oscillator chamber and the amplifier chamber. The estimating of the halogen gas consumption in the at least one oscillatory chamber is based upon a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber is based upon a measured change in a third operating parameter correlated to an empirically determined change in halogen gas content in the at least one amplifier chamber and a measured change in a fourth operating parameter correlated to an empirically determined change in halogen gas content in the at least one amplifier chamber. The estimating of the halogen gas consumption may be based upon a measured change in an operating parameter correlated to an empirically determined change in halogen gas content in a respective one of the oscillator chamber and the amplifier chamber. The estimating of the halogen gas consumption in the at least one oscillatory chamber may be based upon a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber may be based upon a measured change in a third operating parameter correlated to an empirically determined change in halogen gas content in the at least one amplifier chamber and a measured change in a fourth operating parameter correlated to an empirically determined change in halogen gas content in the at least one amplifier chamber.

DETAILED DESCRIPTION OF PREFERRED EMBODIMENTS

Figure 1:
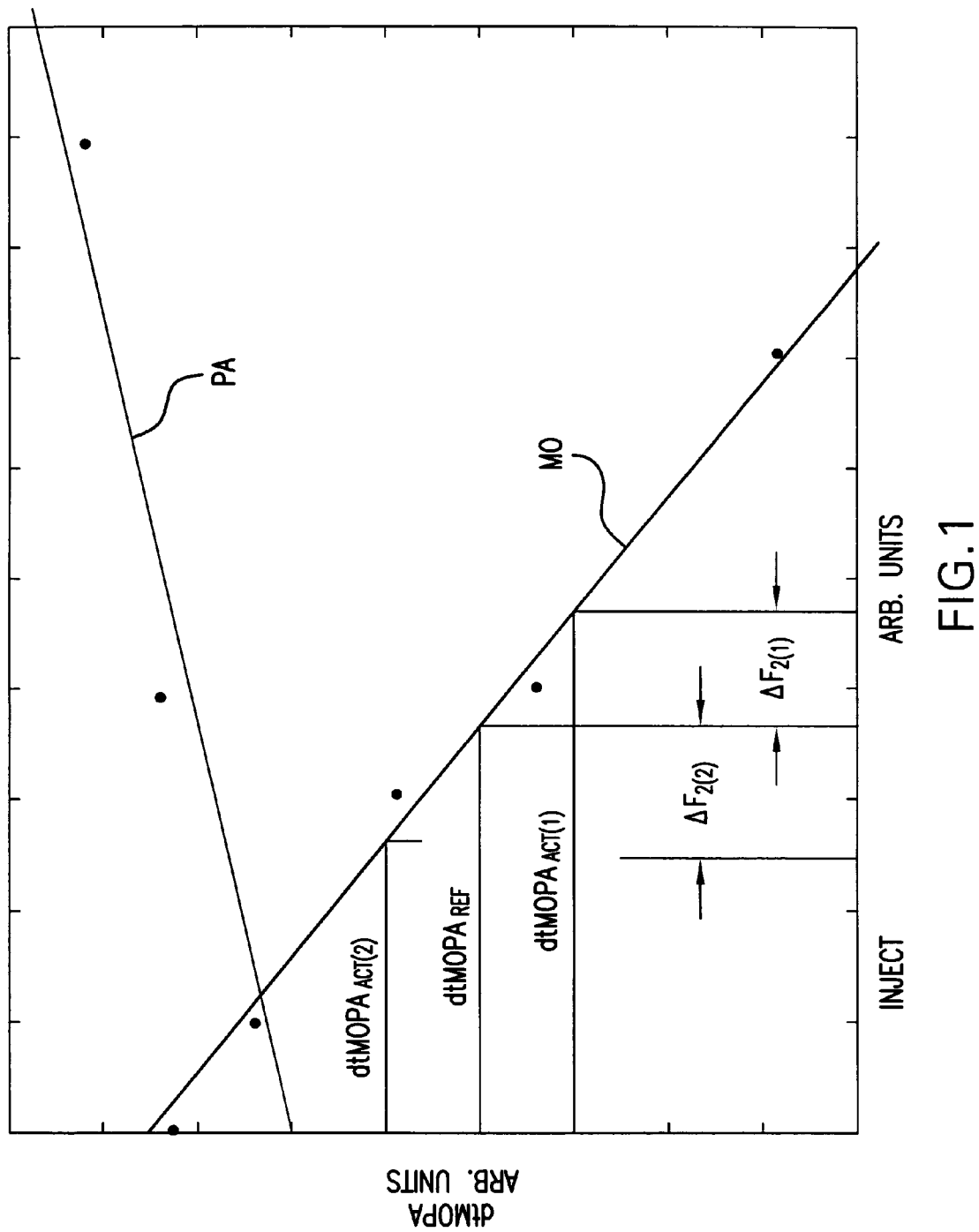
FIG. 1 shows representative relationships for a parameter of laser system operation, e.g., the timing of the difference between the discharges in an oscillator chamber and an amplifier chamber ("dtMOPA") and changes in fluorine consumed in the oscillator chamber and the amplifier chamber that is utilized according to an aspect of an embodiment of the present invention.

Turning now to FIG. 1 there is shown a representative plot for the changes in the timing between the electrical discharges between the electrodes causing a gas discharge in a multi-chambered excimer or molecular gas discharge laser gas forming a laser gas gain medium, e.g., dtMOPA and changes in the amount of $F_2$ in the chamber, i.e., an indication of an amount of consumption of fluorine in a chamber, e.g., the oscillator chamber (MO) and the amplifier chamber (PA) useful according to aspects of an embodiment of the present invention. This is also representative of an amount of an inject ($\Delta F_2$) that is called for, e.g., to get dtMOPA back to some reference value, $dtMOPA_{REF}$, which may be a negative injection (i.e., no injection is required) $\Delta F_{2(1)}$ or a positive injection $\Delta F_{2(2)}$. The plot has $F_2$ content on the horizontal axis in arbitrary units and dtMOPA on the vertical axis in arbitrary units. Similar plots may be made for other operating parameter relationships, e.g., for bandwidth, e.g., as measured by the integral of a certain percentage of the energy contained on either side of a center wavelength of a spectrum centered on the center wavelength, e.g., 95%, also known as E95% or simply E95; the voltage applied to a chamber, e.g., the common voltage applied to both chambers, e.g., at the peaking capacitor of each compression head of each solid state pulsed poser system (SSPPM) for each chamber, and the energy output of one of the chambers, e.g., the oscillator chamber $E_{MO}$.

It will be understood by those skilled in the art that, while the preferred embodiment is a master oscillator-power amplifier multi-chambered excimer or molecular fluorine gas discharge laser system ("MOPA") the system may also be configured to have other oscillator/amplifier configurations, e.g., a master oscillator power oscillator ("MOPO"), a power oscillator-power amplifier ("POPA") or a power oscillator-power oscillator ("POPO") configuration, or the like, with, e.g., the power oscillator first stages not being line narrowed, and the amplifier second stages being a oscillator stage, e.g., an unstable oscillator stage, acting as the amplifier, as opposed to just a stimulated emission amplification of the output of the first stage. It will also be understood that in each of such configurations the output of the first oscillator stage, line narrow or not, is amplified in some fashion in the second stage, oscillator or not. Unless otherwise indicated specifically to the contrary reference to a master oscillator stage or chamber ("MO") in the Specification or the appended claims, and/or a power amplifier stage or chamber ("PA") in the Specification or appended claims, shall be considered to be broad enough to cover any oscillator first stage or chamber feeding a output into any amplifier second stage or chamber for amplification, and the term oscillator chamber or oscillator stage is broad enough to corner any such oscillator stage and the term amplifier chamber or stage is broad enough to cover any such amplifier stage.

Any parameter or combination of operating parameters in may be used to estimate the consumed fluorine in either or both chambers through one or more adjustable sensitivity parameters, denoted $\rho_i$ where i denotes the $i^{th}$ sensitivity parameter in the set. The sensitivity parameter may be adjusted using feedback of measurements of one or more of the parameters. The initial values for the sensitivities, $\rho_i$, may be determined empirically or using physics based principles. FIG. 1 is illustrative of a typical sensitivity plot, e.g., for dtMOPA versus $F_2$ concentration in the MO chamber and PA chamber, useful according to aspects of the present invention.

Figure 3:
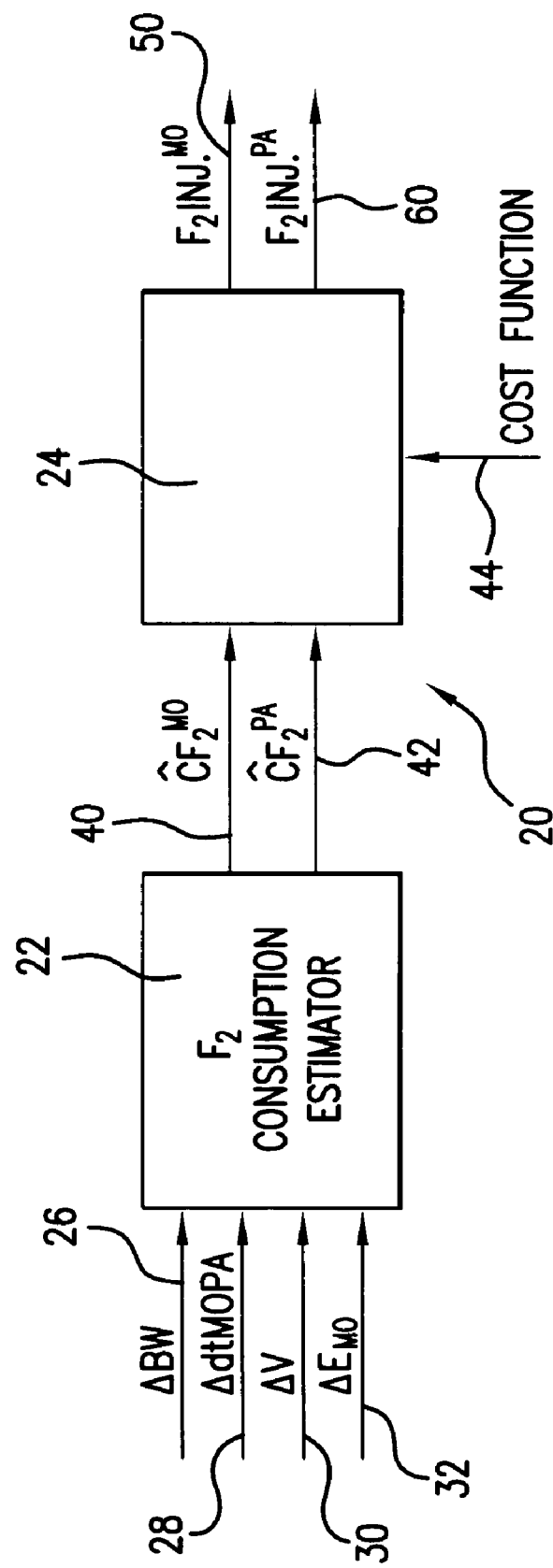
FIG. 3 shows schematically in block diagram form a fluorine injection control system according to aspects of an embodiment of the present invention.

Turning now to FIG. 3 there is shown a fluorine ("$F_2$") injection control system 20 which may comprise, e.g., a fluorine consumption estimator, which may employ several input signals representative of, e.g., the difference between the value of a parameter and some desired reference value, e.g., at some desired level of nominal operation, which is indicative of and/or correlated to the consumption of $F_2$ in the same or other chamber, e.g., bandwidth BW 26, e.g., E95, the discharge timing between the oscillator and amplifier chambers, dtNOPA 28, the applied high voltage, V 30, and the energy output of a chamber, e.g., the oscillator chamber, $E_{mo}$ 32. It will be understood that the $\Delta$ values represent a difference between a measured value for the parameter and some desired reference value, e.g., $BW_{REF}$.

The fluorine consumption estimator utilizes these inputs representative of fluorine consumption (estimated $\Delta F_2$) to compute an estimated fluorine consumption in, e.g., the oscillator chamber, $\hat{C}F_2^{MO}$ 40, and/or an estimated fluorine consumption in the amplifier chamber, $\hat{C}F_2^{PA}$ 42. The values of $\hat{C}F_2^{MO}$ 40 and $\hat{C}F_2^{PA}$ 42 are input into a fluorine injection controller 24, which uses a cost function 44 to produce an amount of a fluorine injection $F_2INJ^{MO}$ for the oscillator chamber and a value for a fluorine injection $F_2INJ^{PA}$ for the oscillator section or chamber, which injection values are utilized in periodic injections of fluorine into either the oscillator chamber or the amplifier chamber. It will be understood that the system may define an opportunity to inject $F_2$ in one or the other of the chambers, e.g., in a two chambered multi-chambered laser system, other than by simply a time period, e.g., some combination of time period with number of shots, duty cycle or the like, or some other indication that the consumption of $F_2$ in one chamber or the other is extraordinary, e.g., one or both of the estimated fluorine consumption values, or other periodic or aperiodic determinations of the time periods for the occurrence of injection opportunities.

According to aspects of an embodiment of the present invention the system 20 may accumulate over some time period, e.g., every 30 seconds, a change in one of the fluorine consumption indicating parameters, e.g., E95, dtMOPA, V and $E_{MO}$, e.g., as compared to some selected reference value. From plots, e.g., as shown in FIG. 1, for any given value of each of these values E95, dtMOPA, V and $E_{MO}$, e.g., dtMOPA, shown in FIG. 1, there can be determined an estimate of the amount of fluorine consumed in either the oscillator chamber, e.g., with respect to the values taken from plots of fluorine consumption vs. E95 and dtMOPA, or the amplifier chamber, e.g., with respect to plots relating to the amount of fluorine consumption for changes in V and $E_{MO}$ for the amplifier chamber. These values may be combined in some fashion by the $F_2$ consumption estimator 22 to obtain the values for the estimated fluorine consumption in the oscillator chamber $\hat{C}F_2^{MO}$ 40 and in the amplifier chamber $\hat{C}F_2^{PA}$42. For example, the values for E95, dtMOPA, V and $E_{MO}$ regarding the respective chambers may be combined according to some trust/confidence factor, i.e., weighting ratio, which may be related to, e.g., the signal to noise ratio ("SNR") of whatever instrument is measuring is measuring the actual consumption related variable, e.g., E95, dtMOPA, V and/or $E_{mo}$ to periodically obtain the values for $\Delta E95$, $\Delta dtMOPA$, $\Delta V$ and $\Delta E_{MO}$. Other calibration of trust/confidence factors may be taken into account as well, e.g., the degree to which an actually measured value, e.g., bandwidth measured using a width at some percentage value of the peak value for a measure spectrum, e.g., fall width half maximum ("FWHM") actually correlated to a corresponding value for E95 bandwidth, then also correlated to fluorine consumption Where two values are used for computing the estimated fluorine consumption in the respective chamber the estimated consumption of fluorine for each such variable may have associated with it some confidence/weighting factor $\alpha$ and for equally SNR impacted signals a may be 0.5, while the other confidence/weighting factor ($1-\alpha$) may then also be 0.5, i.e., equal weighting of the two. However, when one signal has, e.g., a superior SNR in its measurement of the related variable, then it may have a higher $\alpha$, e.g., 0.75, leaving the other value ($1-\alpha$) at 0.25. In this way, utilizing two or more such signals, even if each is relatively noisy or the like in its sensitivity to actual values for or changes in values for, e.g., E95, dtMOPA, V and/or $E_{mo}$, then a more reliable, e.g., less noisy, signal ($\hat{C}F_2^{MO}$ 40 and/or $\hat{C}F_2^{PA}$ 42) may be obtained from the use of the plurality of signals combined.

According to aspects of an embodiment of the present invention, therefore, the values for $\hat{C}F_2^{MO}$ 40 and $\hat{C}F_2^{PA}$ may be computed in the fluorine consumption estimator 22, e.g., as follows:

$$\alpha \hat{C}F_2^{MO}(\Delta E95)+(1-\alpha)\hat{C}F_2^{MO}(\Delta dtMOPA)=\hat{C}F_2^{MO}$$

and $$\alpha \hat{C}F_2^{PA}(\Delta V)+(1-\alpha)\hat{C}F_2^{PA}(\Delta E_{MO})=\hat{C}F_2^{PA}$$

Where $\hat{C}F_2^{MO}$ is the estimated consumption of $F_2$ in the oscillator chamber during the measurement period, e.g., every 30 seconds, and $\hat{C}F_2^{PA}$ is the same for the amplifier chamber, i.e., the estimate for the $\Delta F_2^{MO}$ and the estimate for the $\Delta F_2^{PA}$ from $\tau_0$ to $\tau_1$ equal to, e.g., 30 seconds, and the values of $F_2$ consumed may be obtained from $\Delta E95$, $\Delta dtMOPA$, $\Delta V$ and $\Delta E_{MO}$. Looking at the, e.g., $F_2$ plot for a change in, e.g., voltage for an estimated change in $F_2$, the measured, e.g., voltage may be compared to a reference voltage $V_{REF}$, which is selected to be a desired operation point, which may be, e.g., the voltage that the system settles to after an initial gas fill/refill, and the measured voltage less the $V_{REF}$ based upon the curve, gives an estimated amount of $F_2$ to inject in expectation of returning the voltage from the measured value to $V_{REF}$.

Figure 2:
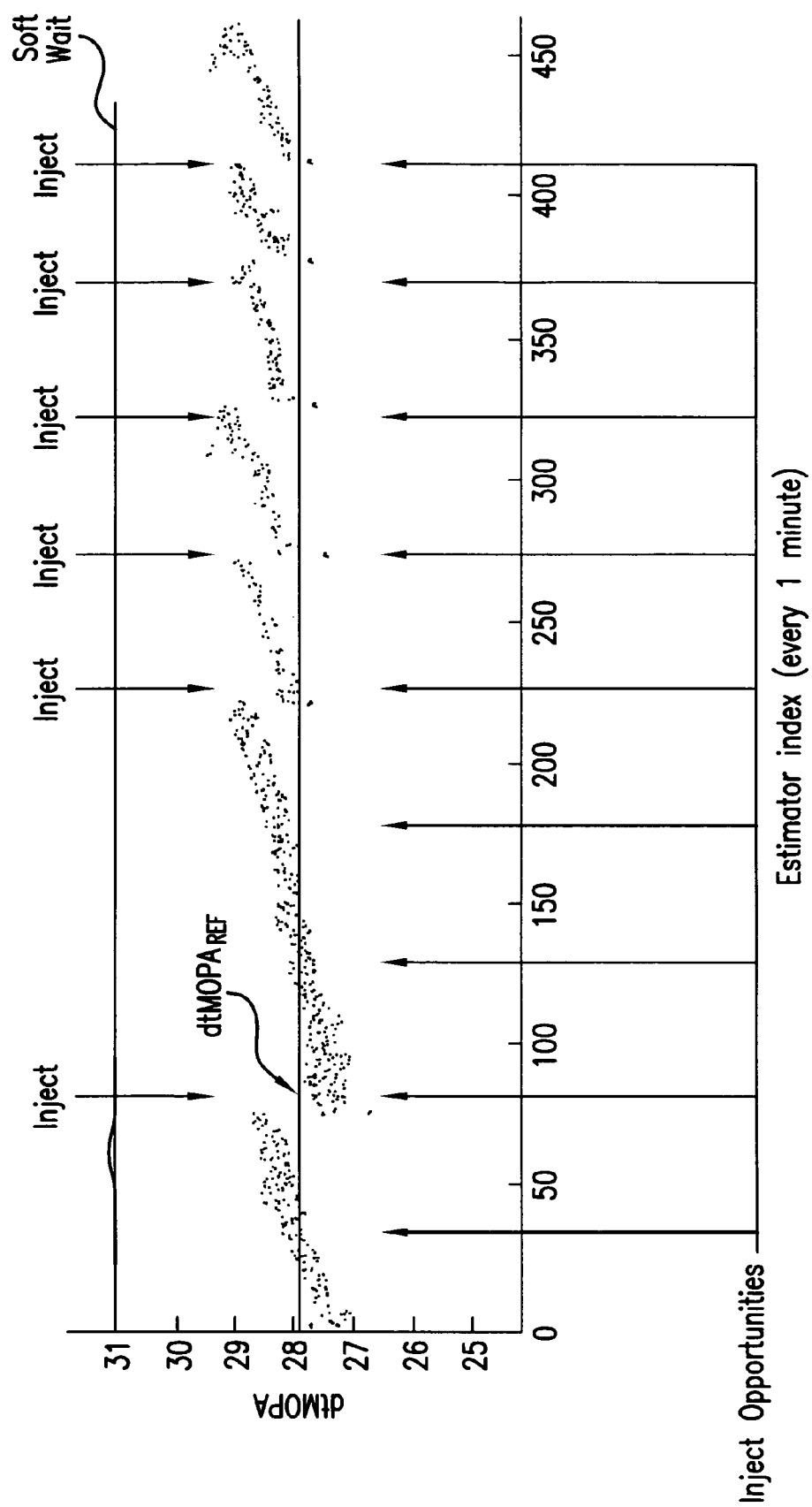
FIG. 2 shows a graph representing the time of injection opportunities, where injections may occur or not occur according to an aspect of an embodiment of the present invention, and the resultant changes in the operating parameter based upon an inject and as $F_2$ is consumed after the inject according to aspects of an embodiment of the present invention.

This then is combined with one or more other estimates for the consumption of $F_2$ in the respective chamber, multiplied by confidence values $\alpha$, to get the value for, e.g., $\hat{C}F_2^{MO}$ as noted above. As shown in FIG. 2, however, injections of $F_2$ into a respective chamber may not achieve a return to the $V_{REF}$ value, or in the case of FIG. 2 a $dtMOPA_{REF}$ value, as indicated generally by the first two injections illustrated in FIG. 2. As is known in the art, and discussed in co-pending patent applications noted above, the system can adaptively modify the plots from actually measured responses to injects of a given size and the observed change in the parameter, e.g., the change in voltage or dtMOPA. Thus, e.g., the slope of the plots in FIG. 1 may adaptively be changed so that the $\Delta F_2$ injection size settles to a size for a given change in the measured parameter where the kind of operation illustrated on the right hand side of FIG. 2 is occurring, i.e., an inject takes the parameter back to substantially the reference point.

FIG. 2 also illustrates, e.g., the presence of a soft limit, which may, e.g., be within some percentage of some hard limit that it is not desired to reach. There may be a situation where one of the overriding decision determinations indicates that an injection should be made, because, e.g., voltage or dtMOPA has reached its soft limit. The decision determination weighting factor according to the cost function would be greater than the indications that, e.g., $\Delta F_2$ is bigger in one chamber or the other, e.g., a decision weighting factor V>soft limit=10 as noted herein, in regard to the cost function for a prefPA INJ.

The cost function may in turn be, e.g., simply a set of weighed decision determinations, from which, e.g., the one having the highest weighted value may be the chosen decision. For, example the decision may be to inject into the oscillator chamber, prefMO INJ=5, if the estimated consumption in the oscillator chamber, $\hat{C}F_2^{MO}$, 40 is greater than the estimated consumption in the amplifier chamber, $\hat{C}F_2^{PA}$, 42. This can be used to select between the injection into the oscillator chamber MO or the amplifier chamber PA, with each having a weight, e.g., 5 that will be exceeded if any of the other control decisions are true. That is, there may also be a control decision to inject into the oscillator chamber prefMO INJ if the value of bandwidth, e.g., E95 is above some limit, e.g., equal to 20% of some specified limit for the upper boundary of bandwidth, e.g., in certain models of laser systems sold by applicants' assignee 1.2 pm, i.e., the 20% upper limit being 1.2 pm−0.24 pm=0.96 pm. This decision being true may be assigned a weight of, e.g., 7. There may also be a decision to inject into the oscillator chamber prefMO INJ is the value for bandwidth, e.g., E95 is within than 5% of some specified lower limit for bandwidth, e.g., 0.8 pm, i.e., the lower limit is of the decision boundary is 0.8 pm+0.04 pm=0.84 pm. The assigned weight for this decision being true may be, e.g., 9. Similarly there may be other weighted decisions, e.g., a preferred injection into the amplifier chamber, prefPA INJ, e.g., if the value for voltage is within 20% of a specified upper limit for chamber voltage, e.g., to the peaking capacitors initiating the discharge between the electrodes in the chamber, e.g., 1150V, i.e., the upper limit of the decision making boundary is, e.g., 1300V−260=1140V. This decision may be weighted at, e.g., 8 and a similar lower decision boundary may be within 5% of 900V, i.e., 900V+45V=940V. The weight for this decision may be, e.g., 10.

Therefore, the fluorine injection controller 24 makes the decision to inject into the oscillator chamber $F_2 INJ^{MO}$ 50 or into the amplifier chamber $F_2 INJ^{PA}$ 60, based on the decision determination that is true and possesses the highest weight. The estimated consumption values being, e.g., equally weighted would be selected based upon which one is true, i.e., $\hat{C}F_2^{MO} > \hat{C}F_2^{PA}$ or $\hat{C}F_2^{PA} > \hat{C}F_2^{MO}$, unless any of the other higher weighted decisions are true, i.e., prefMO INJ ($E95_{upper}$)=7, prefMO INJ ($V_{upper}$)=8, prefMO INJ ($E95_{lower}$)=9 and/or prefMO INJ ($V_{lower}$)=10, in which event the injection into the oscillator chamber $F_2 INJ^{MO}$ 50 or into the amplifier chamber $F_2 INJ^{PA}$ 60 is selected from the one of the later decisions with the highest value, even if, e.g., more than one are true. The controller 24 may have other factors in the cost function, e.g., consumption rate in one or both chambers or combined reaching or exceeding some soft limit or some selected time since last inject.

In short, the fluorine injection control algorithm is based upon an estimate of consumption of fluorine in, e.g., an MO chamber and a PA chamber, based upon the values of laser operating parameters that applicants have found to be closely tracked by fluorine consumption, at least within certain regions where near linearity exists between changes in the two, accounted for by use of the slopes of the $\Delta$ curves, e.g., the $\Delta E95/\Delta F_2$ curve, unless some other system parameter requires injection into a respective one of the dual chambers, due, e.g., to the laser system getting out of some selected operating band that is also fluorine content sensitive. The consumption estimation parameters may also include, e.g., energy (PA chamber), energy (shutter), energy (scanner), energy (wafer), duty cycle, e.g., defined over an window size, firing repetition rate, time, any gas (including fluorine) concentration (MO chamber) as actually measured, any gas (including fluorine) concentration (PA chamber) as actually measured, pressure (MO chamber), pressure (PA chamber), temperature (MO chamber), temperature (PA chamber) and the like.

The injection size of an injection that is determined to be required in one or the other of the chambers may be determined from the above referenced estimate of consumption. The amount of the injection indicated from the plotted data may be in units, e.g., percent of fluorine content, which may need to be converted to, e.g., some value of kPa which is then also related to the total chamber pressure to determine an inject amount.

The controller 24 may, as illustrated in FIG. 2, operate according to preselected periodically occurring injection opportunities, at which an injection may be made into one chamber or the other according to the results of the cost function. As shown in FIG. 2, between the second and fifth arrow indicating inject opportunities, the controller 24 may determine that no injections are needed according to the results of the cost function and, e.g., allow consumption to take the, e.g., dtMOPA from below the reference level to above the reference level and then commence injections. Occasionally the estimated consumption in the MO and PA may be equal and other decision determinations may be false, in which event the controller may be programmed to alternate injections into each of the two chambers of a preselected size or of the estimated consumption in the two chambers, even though there is no preferred injection signal, because consumption in each chamber is the same during the period preceding the respective injection opportunity time period.

The controller may be activated when an inject opportunity occurs to decide on whether to inject and where, with the inject opportunities being defined as times when injects could happen but may not happen, e.g., according to the cost function. The periodicity of and/or the actual occurrence of inject opportunities may depend, e.g., on such factors as duty cycle, and/or, number of shots fired since last inject, and/or, period of time since last inject, and/or, one or both of the fluorine consumed estimates. Therefore the occurrence of inject opportunities may be selectively and adaptively changed by the controller 24 over, e.g., a given gas refill or the chamber life.

Applicants have also determined that gas control in multi-chambered laser systems, e.g., a MOPA excimer or molecular fluorine gas discharge laser systems may be improved by more closely reaching a desired optimum operating pressure in each gas refill that occurs over the usage of the laser system. To this end, applicants have determined that determining the chamber pressure for determining the amount of a fluorine gas refill should be done with the chamber as close to operating temperature and pressure as possible and dynamically circulating the gas as closely to operating conditions as possible, so that this all should be done with the gas circulation system, e.g., the sluirel cage fans used ins laser chambers being sold by applicants assignee, e.g., in 7XXX series and XLA series laser systems. In this manner, the laser system gas temperature and pressure measured for purposes of a refill and with the same sensors as used, e.g., during system operation will be sensing something closely akin to the pressure and temperature after the refill and when the system is in operation, thereby getting the amount of the refill more correct.

It will be understood by those skilled in the art that many changes and variations may be made to the present invention without departing from the scope of aspects of embodiments disclosed in the present application and that these aspects are but illustrations of one or more preferred embodiments. The inventions covered by the appended claims should not be considered to be limited to the preferred embodiments, but can be changed and modified as will be understood by those skilled in the art to include many equivalents of the features disclosed as parts of the preferred embodiments. For example, dtMOPA, strictly defined as the timing between the firing of the discharge between electrodes in the plurality of chambers, may be reflected by, or substituted by, many other parameters of laser operation that reflect this difference in timing, e.g., a signal representative of a detection of the initiation of the actual discharge between the electrodes in the various chambers, or light out from each of the various chambers, or the occurrence of trigger signals to the pulse power systems associated with each of the various chambers, or the voltage pulse to the discharge electrodes peaks or zero crossings, or any of a variety of signals that may be used by or produced by, e.g., a controller, e.g., as sold by applicants' assignee in XLA series MOPA laser systems that seek, e.g., to optimize the difference in time between fining the laser in the MO chamber and PA chamber for reasons, e.g., of bandwidth, dose or voltage control. These and other parameters can be utilized in determining the timing difference between the occurrence of a gas discharge in the gain medium between electrodes in the one chamber vis-a-vis the same occurrence in the other chamber, e.g., in a two chambered system, or between all or certain combinations of chambers in a multi-chambered system with three of more chambers, which, strictly speaking, is the timing difference represented by dtMOPA. Thus, dtMOPA should be considered to be used in this application and appended claims to be broad enough to cover all of these and other measurements of the timing between the operation of, e.g., the oscillator chamber and the amplifier chamber that relate, e.g., to the parameter dtMOPA and, similarly to dtMOPA, are reflective of changes in fluorine content in one or the other of the various laser chambers in a multi-chambered laser system due, e.g., to consumption of fluorine and, therefore, can be used to estimate fluorine consumption. Also, other parameters that can be shown to correlate to fluorine consumption in the fluorine consumption estimator, energy output of the amplifier laser, voltage to the oscillator chamber or amplifier chamber if separately controlled, and charging voltage input to the SSPPM for the oscillator chamber or the amplifier chamber, if separately controlled.

As noted above, dtMOPA is intended to be inclusive of the difference in discharge timing between other forms of multi-chambered laser systems, including, e.g., MOPO configured systems, POPA configured systems and POPO configured systems.

It will also be noted by those skilled in the art that various operating parameters utilized in the present invention may only be estimations of or approximations of actual operating parameters, within the abilities of certain metrology instruments to measure the actual parameters. For example E95 may be measured variously as an actual integral under the spectrum curve at given center wavelengths and changes in that value empirically correlated to actual changes in, e.g., the concentration of $F_2$ in the MO chamber. This may be done using so-called on board spectrometry instrumentation such as are used, e.g., in applicants' assignees 70XX series or XLA-XXX series single chamber and multi-chamber laser systems or, e.g., with portable spectrometry instruments, e.g., LTB gratings, and have the results of that be empirically recorded to determine, e.g., $\Delta E95/\Delta F_2$ for use in the present system, while then relying on, e.g., the actual measurement of bandwidth as a function of some percentage of the peak maximum(s), e.g., FWHM, which is calibrated and correlated to values of E95 as explained in co-pending applications assigned to applicants' assignee and incorporated herein by reference above. The parameter values may be those already produced for and used in laser feedback and control systems, such as those mentioned above for gas control feedback or for other feedback and control reasons, and those skilled in the art with appreciate that to the degree the values so used are not precise, are approximations or empirically determined correlations or are derived from other signals or values that are indicative of what the value desired to be measured actually is, or are subject to noise and drift and other signal errors, and are used as such in existing laser system feedback and control, they are to the same extent useable for measurement of the laser operating parameters used in aspects of embodiments of the present invention. This is within the scope of the present invention wherein certain laser operating parameters relating to one or the other of the two chambers in a multi-chambered laser system, e.g., a MOPA system with a MO oscillator chamber and a PA amplifier chamber, have been determined by applicants to be good indicators by their change in value to the change in the concentration of, e.g., $F_2$, in the same or in the other chamber and can be used as such according to aspects of embodiments of the present invention within whatever bounds of measurement error, signal noise, need to correlate to or calibrate from some other measured value is the case, and the present invention does not require that, e.g., E95 be even actually measured or attempted to be measured and/or be a precisely measured to obtain an actual E95 value. The same may be said for other parameters, e.g., dtMOPA.

Similarly, in order to improve the accuracy of measurements of the parameters, such as those referenced in the present application and like useable parameters, according to aspects of the present invention, techniques such as integrating signals representative of a given value over, e.g., a number of laser pulses at the laser pulse repetition rate and/or averaging of values determined for such parameter over some window, e.g., a rolling window of laser pulses, and using weighted averaging and like techniques as are well known in the art of instrumental measurement signal processing may be employed with aspects of the present invention and the details of such are not within the scope of the present invention or necessary for the understanding of the concepts embodied in the appended claims defining the various aspects of the present invention. The present invention contemplates using such signals in whatever form and with whatever accuracy as representative of some operating parameter value in the same way as the actual precisely determined value, were such available, to the system herein described, so long as an effective correlation to fluorine consumption is available.

In addition, other halogen based multi-chambered laser systems may also utilize aspects of embodiments of the inventions disclosed in the present application, e.g., XeCl, XeF, and multi-stage laser systems where one stage is a solid state laser, e.g., an Nd:YAG or Nd:YLF seed laser, and like laser systems.

It will be understood by those skilled in the art that other parameters of either chamber may be utilized as indicative of consumption of, e.g., $F_2$ in the same or the other chamber, including, output pulse energy from either chamber, pulse energy at the shutter or at the terminus of a BDU or at some position in a utilization tool, e.g., a stepper/scanner integrated circuit lithography tool, duty cycle, which may be some weighted average over, e.g., some prior window of time, pulse repetition rate, which may be similarly weighted and/or averaged, elapsed time and also including some actual measurement, e.g., with a fluorine detector of the actual change in $F_2$ content in a respective chamber to get $\Delta F_2$ actual ($F_2$ consumed), bandwidth measured a some percentage of maximum, e.g., full width half max ("FWHM"), pressure, temperature, other measures of beam quality, e.g., energy stability, wavelength stability, beam pointing, beam profile stability, etc. It will also be understood that these parameters and others mentioned above may be utilized in the form of first or higher order derivatives of one with respect to another or combinations of such, e.g., $dV/dE_{MO}$ or $dv/dE_{PA}$ or $\Delta dV/dE_{MO}$ or $\Delta dV/dE_{PA}$. In addition the parameters may be used in combinations of more than two for purposes of determining, e.g., the estimation of $F_2$ consumption with weighting factors of $\alpha_1, \alpha_2 \ldots \alpha_n$ where $\alpha_1+\alpha_2 \ldots +\alpha_n=1$. These sensitivity parameters may be adjustable over the life of a laser system and/or for the given parameter as opposed to another parameter(s).

Applicants have noted that in multi-chambered laser systems, e.g., the XLA series laser systems sold by applicants' assignee Cymer, the fluorine management system can inject in such a pattern and amount that there results an overabundance of fluorine, in one chamber, e.g., the MO chamber. Applicants have also determined that this condition can be accompanied by extreme (unusually short) values of dtMOPA required, e.g., for maximizing output energy efficiency. This has indicated to applicants that it is possible to use the optimal value of dtMOPA a MOPA laser as itself the indicator of the fluorine concentration in the MO chamber and as an input to the gas management algorithm for decisions on the frequency and size of fluorine injections. Applicants also note that the output energy of a multi-chambered laser, e.g., a MOPA system strongly depends on the relative timing of the output pulse of the oscillator and the optical gain of the amplifier. In a Cymer MOPA excimer laser, the timing, e.g., between the zero-crossings of the discharge voltage (Vcp) of the two chambers is measured and can be adaptively controlled, e.g., in order to optimize the output energy efficiency as is done, e.g., in XLA series laser systems sold by applicants' assignee. The optimal Vcp timing can include as one component the time between the MO discharge Vcp zero-crossing and the appearance of the MO output light pulse. This is the time it takes for the oscillator signal to develop, e.g., to its maximum amplitude, and is a strong function of the gain of the MO lasing medium, which in turn is a function of the fluorine concentration in the MO gas mixture. Under the typical conditions of laser operation, the greater the fluorine concentration, the greater the gain, the shorter the amount of time from Vcp zero-crossing (nearly coinciding with the maximum of the pump current) to the appearance of the peak of the MO laser pulse (this is true up to a certain limit, since at excessively high F2 concentrations the discharge itself can become delayed and unstable, which can result in decreased laser gain). The use of MO Vcp–MO light timing for fluorine control is discussed in an above referenced co-pending patent application. Applicants here propose the use of MO Vcp–PA Vcp delay for the same purpose. It is a closely related quantity that includes the time of of MO Vcp–MO light time as a component (probably the biggest contributor) to the control system timing of the firing of the discharge in the PA chamber. The advantage of using, e.g., MO Vcp–PA Vcp is that this quantity is more easily measurable and is in fact readily available, e.g., on XLA systems. Anther component that it can also include is the time between the PA Vcp zero crossing and peak PA gain. This quantity is believed to be much smaller and relatively independent of fluorine concentration in either chamber.

We claim:

1. A multi-chambered excimer or molecular halogen gas discharge laser system comprising at least one oscillator chamber and at least one amplifier chamber producing oscillator output laser light pulses that are amplified in the at least one power chamber, having a fluorine injection control system comprising:

a halogen gas consumption estimator estimating the amount of halogen gas that has been consumed in one of the at least one oscillator chamber and at least one amplifier chamber by executing a formula having inputs comprising at least a first operating parameter of one of the least one oscillator chamber and the at least one amplifier chamber, and the difference between a second operating parameter of the at least one oscillator chamber and the at least one amplifier chamber, and estimating the amount of halogen gas that has been consumed in the other of the at least one oscillator chamber and the at least one amplifier chamber by executing a formula having an input comprising at least a third operating parameter of the other of the at least one oscillator chamber and the at least one amplifier chamber, and producing an output representative of an estimated halogen gas consumption in the at least one oscillator chamber and of the halogen gas consumption in the at least one amplifier chamber.

2. The apparatus of claim 1 further comprising:
a halogen gas injection controller determining the amount of halogen gas injection for the at least one oscillator chamber and the at least one amplifier chamber by executing a formula having inputs comprising the estimated fluorine consumption outputs from the fluorine consumption estimator and a cost function comprising a plurality of weighted injection decision determinations.

3. The apparatus of claim 1 further comprising:
the first operating parameter is the bandwidth of the output pulses of the at least one amplifier chamber;
the second operating parameter is representative of the time of firing of the gas discharges in the at least one oscillator chamber and the at least one amplifier chamber;
the third operating parameter is the energy of the output pulses of the at least one oscillator chamber.

4. The apparatus of claim 2 further comprising:
the first operating parameter is the bandwidth of the output pulses of the at least one amplifier chamber;
the second operating parameter is representative of the time of firing of the gas discharges in the at least one oscillator chamber and the at least one amplifier chamber;
the third operating parameter is the energy of the output pulses of the at least one oscillator chamber.

5. The apparatus of claim 1 further comprising:
the halogen gas is fluorine.

6. The apparatus of claim 2 further comprising:
the halogen gas is fluorine.

7. The apparatus of claim 3 further comprising:
the halogen gas is fluorine.

8. The apparatus of claim 4 further comprising:
the halogen gas is fluorine.

9. The apparatus of claim 5 further comprising:
the estimating of the fluorine consumption in the at least one oscillator chamber is carried out by executing the formula:

$$\alpha \hat{C}F_2^{MO}(dtMOPA)+(1-\alpha)\hat{C}F_2^{MO}(E95)=\hat{C}F_2^{MO} \text{ and}$$

the estimating of the fluorine consumption in the at least one amplifier chamber is carried out by executing the formula:

$$\alpha \hat{C}F_2^{PA}(V)+(1-\alpha)\hat{C}F_2^{PA}(E_{MO})=\hat{C}F_2^{PA}.$$

10. The apparatus of claim 6 further comprising:
the estimating of the fluorine consumption in the at least one oscillator chamber is carried out by executing the formula:

$$\alpha \hat{C}F_2^{MO}(dtMOPA)+(1-\alpha)\hat{C}F_2^{MO}(E95)=\hat{C}F_2^{MO} \text{ and}$$

the estimating of the fluorine consumption in the at least one amplifier chamber is carried out by executing the formula:

$$\alpha \hat{C}F_2^{PA}(V)+(1-\alpha)\hat{C}F_2^{PA}(E_{MO})=\hat{C}F_2^{PA}.$$

11. The apparatus of claim 7 further comprising:
the estimating of the fluorine consumption in the at least one oscillator chamber is carried out by executing the formula:

$$\alpha \hat{C}F_2^{MO}(dtMOPA)+(1-\alpha)\hat{C}F_2^{MO}(E95)=\hat{C}F_2^{MO} \text{ and}$$

the estimating of the fluorine consumption in the at least one amplifier chamber is carried out by executing the formula:

$$\alpha \hat{C}F_2^{PA}(V)+(1-\alpha)\hat{C}F_2^{PA}(E_{MO})=\hat{C}F_2^{PA}.$$

12. The apparatus of claim 8 further comprising:
the estimating of the fluorine consumption in the at least one oscillator chamber is carried out by executing the formula:

$$\alpha \hat{C}F_2^{MO}(dtMOPA)+(1-\alpha)\hat{C}F_2^{MO}(E95)=\hat{C}F_2^{MO} \text{ and}$$

the estimating of the fluorine consumption in the at least one amplifier chamber is carried out by executing the formula:

$$\alpha \hat{C}F_2^{PA}(V)+(1-\alpha)\hat{C}F_2^{PA}(E_{MO})=\hat{C}F_2^{PA}.$$

13. The apparatus of claim 9 further comprising:
the cost function comprising:
if $\hat{C}F_2^{MO} > \hat{C}F_2^{PA}$ then prefer oscillator injection=A; and
if $\hat{C}F_2^{PA} > \hat{C}F_2^{MO}$ then prefer amplifier injection=A'.

14. The apparatus of claim 10 further comprising:
the cost function comprising:
if $\hat{C}F_2^{MO} > \hat{C}F_2^{PA}$ then prefer oscillator injection=A; and
if $\hat{C}F_2^{PA} > \hat{C}F_2^{MO}$ then prefer amplifier injection=A'.

15. The apparatus of claim 11 further comprising:
the cost function comprising:
if $\hat{C}F_2^{MO} > \hat{C}F_2^{PA}$ then prefer oscillator injection=A; and
if $\hat{C}F_2^{PA} > \hat{C}F_2^{MO}$ then prefer amplifier injection=A'.

16. The apparatus of claim 12 further comprising:
the cost function comprising:
if $\hat{C}F_2^{MO} > \hat{C}F_2^{PA}$ then prefer oscillator injection=A; and
if $\hat{C}F_2^{PA} > \hat{C}F_2^{MO}$ then prefer amplifier injection=A'.

17. The apparatus of claim 13 further comprising:
the cost function comprising:
if bandwidth>a selected limit then prefer oscillator injection=B; and
if bandwidth<a selected limit then prefer oscillator injection=C.

18. The apparatus of claim 14 further comprising:
the cost function comprising:
if bandwidth>a selected limit then prefer oscillator injection=B; and
if bandwidth<a selected limit then prefer oscillator injection=C.

19. The apparatus of claim 15 further comprising:
the cost function comprising:
if bandwidth>a selected limit then prefer oscillator injection=B; and
if bandwidth<a selected limit then prefer oscillator injection=C.

20. The apparatus of claim 16 further comprising:
the cost function comprising:
if bandwidth>a selected limit then prefer oscillator injection=B; and
if bandwidth<a selected limit then prefer oscillator injection=C.

21. The apparatus of claim 17 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

22. The apparatus of claim 18 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

23. The apparatus of claim 19 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

24. The apparatus of claim 20 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

25. The apparatus of claim 21 further comprising:
$A=A'<B<D<C<E$.

26. The apparatus of claim 22 further comprising:
$A=A'<B<D<C<E$.

27. The apparatus of claim 23 further comprising:
$A=A'<B<D<C<E$.

28. The apparatus of claim 24 further comprising:
$A=A'<B<D<C<E$.

29. The apparatus of claim 25 further comprising:
the fluorine injection controller implements a fluorine injection by executing a formula having an input comprising the weighted injection decision determination with the highest score.

30. The apparatus of claim 26 further comprising:
the fluorine injection controller implements a fluorine injection by executing a formula having an input comprising the weighted injection decision determination with the highest score.

31. The apparatus of claim 27 further comprising:
the fluorine injection controller implements a fluorine injection by executing a formula having an input comprising the weighted injection decision determination with the highest score.

32. The apparatus of claim 28 further comprising:
the fluorine injection controller implements a fluorine injection by executing a formula having an input comprising the weighted injection decision determination with the highest score.

33. A multi-chambered excimer or molecular halogen gas discharge laser system comprising at least one oscillator chamber and at least one amplifier chamber producing oscillator output laser light pulses that are amplified in the at least one power chamber, having a fluorine injection control system comprising:
a halogen gas consumption estimator
estimating the amount of halogen gas that has been consumed in one of the at least one oscillator and at least one amplifier chamber by executing a formula having an input comprising the difference between an operating parameter of the at least one oscillator chamber and the at least one amplifier chamber, and
estimating the amount of halogen gas that has been consumed in the other of the at least one oscillator chamber and amplifier chamber, and
producing an output representative of an estimated halogen gas consumption in the at least one oscillator chamber and in the at least one amplifier chamber.

34. The apparatus of claim 33 further comprising:
a halogen gas injection controller determining the amount of halogen gas injection for the at least one oscillator chamber and the at least one amplifier chamber by executing a formula having inputs comprising the estimated halogen gas consumption outputs from the halogen gas consumption estimator and a cost function comprising a plurality of weighted injection decision determinations.

35. The apparatus of claim 33 further comprising:
the halogen gas is fluorine.

36. The apparatus of claim 34 further comprising:
the halogen gas is fluorine.

37. The apparatus of claim 33 further comprising:
the operating parameter is the timing of the gas discharge in the respective ones of the at least one oscillator chamber and the at least one amplifier chamber.

38. The apparatus of claim 34 further comprising:
the operating parameter is the timing of the gas discharge in the respective ones of the at least one oscillator chamber and the at least one amplifier chamber.

39. The apparatus of claim 35 further comprising:
the operating parameter is the timing of the gas discharge in the respective ones of the at least one oscillator chamber and the at least one amplifier chamber.

40. The apparatus of claim 36 further comprising:
the operating parameter is the timing of the gas discharge in the respective ones of the at least one oscillator chamber and the at least one amplifier chamber.

41. A multi-chambered excimer or molecular halogen gas discharge laser system comprising at least one oscillator chamber and at least one amplifier chamber producing oscillator output laser light pulses that are amplified in the at least one power chamber, having a fluorine injection control system comprising:
a halogen gas consumption estimator
estimating the amount of halogen gas that has been consumed in one of the at least one oscillator and at least one amplifier chamber by executing a formula having an input comprising an operating parameter of the other of the at least one oscillator chamber and the at least one amplifier chamber, and
estimating the amount of halogen gas that has been consumed in the other of the at least one oscillator chamber and amplifier chamber, and
producing an output representative of an estimated halogen gas consumption in the at least one oscillator chamber and in the at least one amplifier chamber.

42. The apparatus of claim 41 further comprising:
a halogen gas injection controller determining the amount of halogen gas injection for the at least one oscillator chamber and the at least one amplifier chamber by executing a formula having inputs comprising the estimated fluorine consumption outputs from the fluorine consumption estimator and a cost function comprising a plurality of weighted injection decision determinations.

43. The apparatus of claim 41 further comprising:
the halogen gas is fluorine.

44. The apparatus of claim 42 further comprising:
the halogen gas is fluorine.

45. The apparatus of claim 41 further comprising:
the operating parameter is E95.

46. The apparatus of claim 42 further comprising:
the operating parameter is E95.

47. The apparatus of claim 43 further comprising:
the operating parameter is E95.

48. The apparatus of claim 44 further comprising:
the operating parameter is E95.

49. A multi-chambered excimer or molecular halogen gas discharge laser system comprising at least one oscillator chamber and at least one amplifier chamber producing oscillator output laser light pulses that are amplified in the at least one amplifier chamber, having a fluorine injection control system comprising:
a halogen gas consumption estimator estimating the amount of halogen gas that has been consumed in each of the at least one oscillator chamber and the at least one amplifier chamber, by executing a formula having inputs comprising at least one parameter indicative of an amount of halogen gas consumption in the at least one oscillator chamber and at least one parameter indicative of an amount of halogen gas consumption in the at least one amplifier chamber and producing an output representative of the halogen gas consumption of the at least one oscillator chamber and an output representative of the halogen gas consumption of the at least one amplifier chamber.

50. The apparatus of claim 49 further comprising:
a halogen gas injection controller determining the amount of a halogen gas injection for the at least one oscillator chamber and the at least one amplifier chamber by executing a formula having inputs comprising the estimated halogen gas consumption outputs from the halogen gas consumption estimator and a cost function comprising a plurality of weighted injection decision determinations.

51. The apparatus of claim 49 further comprising:
the halogen gas is fluorine.

52. The apparatus of claim 50 further comprising:
the halogen gas is fluorine.

53. The apparatus of claim 49 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and
the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

54. The apparatus of claim 50 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and
the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

55. The apparatus of claim 51 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and
the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

56. The apparatus of claim 52 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and
the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

57. The apparatus of claim 53 further comprising:
the cost function comprising a decision having a first weighting factor to inject halogen gas into the at least oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

58. The apparatus of claim 54 further comprising:
the cost function comprising a decision having a first weighting factor to inject halogen gas into the at least oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

59. The apparatus of claim 55 further comprising:
the cost function comprising a decision having a first weighting factor to inject halogen gas into the at least oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

60. The apparatus of claim 56 further comprising:
the cost function comprising a decision having a first weighting factor to inject halogen gas into the at least oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

61. The apparatus of claim 57 further comprising:
the other weighted injection decision determinations are selected from the group of whether the bandwidth is out of specification high or low within a range of bandwidths and whether the voltage is out of specification, high or low, within a range of voltages.

62. The apparatus of claim 58 further comprising:
the other weighted injection decision determinations relating to fluorine injection into the at least one amplifier chamber are selected from the group comprising whether the voltage is out of specification high or low within a range of voltages.

63. The apparatus of claim 59 further comprising:
the other weighted injection decision determinations relating to fluorine injection into the at least one amplifier chamber are selected from the group comprising whether the voltage is out of specification high or low within a range of voltages.

64. The apparatus of claim 60 further comprising:
the other weighted injection decision determinations relating to fluorine injection into the at least one amplifier chamber are selected from the group comprising whether the voltage is out of specification high or low within a range of voltages.

65. The apparatus of claim 1 further comprising:
the estimating of the halogen gas consumption is by executing a formula having an input comprising a measured change in an operating parameter correlated to an empirically determined change in halogen gas content in a respective one of the oscillator chamber and the amplifier chamber.

66. The apparatus of claim 2 further comprising:
the estimating of the halogen gas consumption is by executing a formula having an input comprising a measured change in an operating parameter correlated to an empirically determined change in halogen gas content in a respective one of the oscillator chamber and the amplifier chamber.

67. The apparatus of claim 3 further comprising:
the estimating of the halogen gas consumption is by executing a formula having an input comprising a measured change in an operating parameter correlated to an empirically determined change in halogen gas content in a respective one of the oscillator chamber and the amplifier chamber.

68. The apparatus of claim 4 further comprising:
the estimating of the halogen gas consumption is by executing a formula having an input comprising a measured change in an operating parameter correlated to an empirically determined change in halogen gas content in a respective one of the oscillator chamber and the amplifier chamber.

69. The apparatus of claim 65 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

70. The apparatus of claim 66 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

71. The apparatus of claim 67 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

72. The apparatus of claim 68 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

73. The apparatus of claim 33 further comprising:

the estimating of the halogen gas consumption by executing a formula having an input comprising a measured change in an operating parameter correlated to an empirically determined change in halogen gas content in a respective one of the oscillator chamber and the amplifier chamber.

74. The apparatus of claim 34 further comprising:

the estimating of the halogen gas consumption by executing a formula having an input comprising a measured change in an operating parameter correlated to an empirically determined change in halogen gas content in a respective one of the oscillator chamber and the amplifier chamber.

75. The apparatus of claim 35 further comprising:

the estimating of the halogen gas consumption by executing a formula having an input comprising a measured change in an operating parameter correlated to an empirically determined change in halogen gas content in a respective one of the oscillator chamber and the amplifier chamber.

76. The apparatus of claim 36 further comprising:

the estimating of the halogen gas consumption by executing a formula having an input comprising a measured change in an operating parameter correlated to an empirically determined change in halogen gas content in a respective one of the oscillator chamber and the amplifier chamber.

77. The apparatus of claim 73 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

78. The apparatus of claim 74 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

79. The apparatus of claim 75 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

80. The apparatus of claim 76 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

81. The apparatus of claim 41 further comprising:

the estimating of the halogen gas consumption by executing a formula having an input comprising a measured change in an operating parameter correlated to an empirically determined change in halogen gas content in a respective one of the oscillator chamber and the amplifier chamber.

82. The apparatus of claim 42 further comprising:

the estimating of the halogen gas consumption by executing a formula having an input comprising a measured change in an operating parameter correlated to an empirically determined change in halogen gas content in a respective one of the oscillator chamber and the amplifier chamber.

83. The apparatus of claim 43 further comprising:

the estimating of the halogen gas consumption by executing a formula having an input comprising a measured change in an operating parameter correlated to an empirically determined change in halogen gas content in a respective one of the oscillator chamber and the amplifier chamber.

84. The apparatus of claim 44 further comprising:
the estimating of the halogen gas consumption by executing a formula having an input comprising a measured change in an operating parameter correlated to an empirically determined change in halogen gas content in a respective one of the oscillator chamber and the amplifier chamber.

85. The apparatus of claim 81 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

86. The apparatus of claim 82 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

87. The apparatus of claim 83 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

88. The apparatus of claim 84 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

89. The apparatus of claim 49 further comprising:
the estimating of the halogen gas consumption by executing a formula having an input comprising a measured change in an operating parameter correlated to an empirically determined change in halogen gas content in a respective one of the oscillator chamber and the amplifier chamber.

90. The apparatus of claim 50 further comprising:
the estimating of the halogen gas consumption by executing a formula having an input comprising a measured change in an operating parameter correlated to an empirically determined change in halogen gas content in a respective one of the oscillator chamber and the amplifier chamber.

91. The apparatus of claim 51 further comprising:
the estimating of the halogen gas consumption by executing a formula having an input comprising a measured change in an operating parameter correlated to an empirically determined change in halogen gas content in a respective one of the oscillator chamber and the amplifier chamber.

92. The apparatus of claim 52 further comprising:
the estimating of the halogen gas consumption by executing a formula having an input comprising a measured change in an operating parameter correlated to an empirically determined change in halogen gas content in a respective one of the oscillator chamber and the amplifier chamber.

93. The apparatus of claim 89 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

94. The apparatus of claim 90 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

95. The apparatus of claim 91 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

96. The apparatus of claim 92 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

97. A multi-chambered excimer or molecular halogen gas discharge laser system comprising at least one oscillator chamber and at least one amplifier chamber producing oscillator output laser light pulses that are amplified in the at least one amplifier chamber, having a fluorine injection control system comprising:
a halogen gas consumption estimating means for:
estimating the amount of halogen gas that has been consumed in one of the at least one oscillator chamber by executing a formula having inputs comprising at least a first operating parameter of one of the least one oscillator chamber and the at least one amplifier chamber, and
the difference between a second operating parameter of the at least one oscillator chamber and the at least one amplifier chamber, and
estimating the amount of halogen gas that has been consumed in the other of the at least one oscillator chamber and the at least one amplifier chamber by executing a formula having an input comprising at least a third operating parameter of the other of the at least one oscillator chamber and the at least one amplifier chamber, and
producing an output representative of an estimated halogen gas consumption in the at least one oscillator chamber and of the halogen gas consumption in the at least one amplifier chamber.

98. The apparatus of claim 97 further comprising:
a halogen gas injection controller means for determining the amount of halogen gas injection for the at least one oscillator chamber and the at least one amplifier chamber by executing a formula having inputs comprising the estimated halogen gas consumption outputs from the halogen gas consumption estimator means and a cost function comprising a plurality of weighted injection decision determinations.

99. The apparatus of claim 97 further comprising:
the first operating parameter is the bandwidth of the output pulses of the at least one amplifier chamber;
the second operating parameter is representative of the time of firing of the gas discharges in the at least one oscillator chamber and the at least one amplifier chamber;
the third operating parameter is the energy of the output pulses of the at least one oscillator chamber.

100. The apparatus of claim 98 further comprising:
the first operating parameter is the bandwidth of the output pulses of the at least one amplifier chamber;
the second operating parameter is representative of the time of firing of the gas discharges in the at least one oscillator chamber and the at least one amplifier chamber;
the third operating parameter is the energy of the output pulses of the at least one oscillator chamber.

101. The apparatus of claim 97 further comprising:
the halogen gas is fluorine.

102. The apparatus of claim 98 further comprising:
the halogen gas is fluorine.

103. The apparatus of claim 99 further comprising:
the halogen gas is fluorine.

104. The apparatus of claim 100 further comprising:
the halogen gas is fluorine.

105. The apparatus of claim 101 further comprising:
the means for estimating the fluorine consumption in the at least one oscillator chamber carries out the formula:

$$\alpha \hat{C}F_2^{MO}(dtMOPA)+(1-\alpha)\hat{C}F_2^{MO}(E95)=\hat{C}F_2^{MO} \text{ and}$$

the means for estimating the fluorine consumption in the at least one amplifier chamber is carries out the formula:

$$\alpha \hat{C}F_2^{PA}(V)+(1-\alpha)\hat{C}F_2^{PA}(E_{MO})=\hat{C}F_2^{PA}.$$

106. The apparatus of claim 102 further comprising:
the means for estimating the fluorine consumption in the at least one oscillator chamber carries out the formula:

$$\alpha \hat{C}F_2^{MO}(dtMOPA)+(1-\alpha)\hat{C}F_2^{MO}(E95)=\hat{C}F_2^{MO} \text{ and}$$

the means for estimating the fluorine consumption in the at least one amplifier chamber is carries out the formula:

$$\alpha \hat{C}F_2^{PA}(V)+(1-\alpha)\hat{C}F_2^{PA}(E_{MO})=\hat{C}F_2^{PA}.$$

107. The apparatus of claim 103 further comprising:
the means for estimating the fluorine consumption in the at least one oscillator chamber carries out the formula:

$$\alpha \hat{C}F_2^{MO}(dtMOPA)+(1-\alpha)\hat{C}F_2^{MO}(E95)=\hat{C}F_2^{MO} \text{ and}$$

the means for estimating the fluorine consumption in the at least one amplifier chamber is carries out the formula:

$$\alpha \hat{C}F_2^{PA}(V)+(1-\alpha)\hat{C}F_2^{PA}(E_{MO})=\hat{C}F_2^{PA}.$$

108. The apparatus of claim 104 further comprising:
the means for estimating the fluorine consumption in the at least one oscillator chamber carries out the formula:

$$\alpha \hat{C}F_2^{MO}(dtMOPA)+(1-\alpha)\hat{C}F_2^{MO}(E95)=\hat{C}F_2^{MO} \text{ and}$$

the means for estimating the fluorine consumption in the at least one amplifier chamber is carries out the formula:

$$\alpha \hat{C}F_2^{PA}(V)+(1-\alpha)\hat{C}F_2^{PA}(E_{MO})=\hat{C}F_2^{PA}.$$

109. The apparatus of claim 105 further comprising:
the cost function comprising:
if $\hat{C}F_2^{MO} > \hat{C}F_2^{PA}$ then prefer oscillator injection=A; and
if $\hat{C}F_2^{PA} > \hat{C}F_2^{MO}$ then prefer amplifier injection=A'.

110. The apparatus of claim 106 further comprising:
the cost function comprising:
if $\hat{C}F_2^{MO} > \hat{C}F_2^{PA}$ then prefer oscillator injection=A; and
if $\hat{C}F_2^{PA} > \hat{C}F_2^{MO}$ then prefer amplifier injection=A'.

111. The apparatus of claim 107 further comprising:
the cost function comprising:
if $\hat{C}F_2^{MO} > \hat{C}F_2^{PA}$ then prefer oscillator injection=A; and
if $\hat{C}F_2^{PA} > \hat{C}F_2^{MO}$ then prefer amplifier injection=A'.

112. The apparatus of claim 108 further comprising:
the cost function comprising:
if $\hat{C}F_2^{MO} > \hat{C}F_2^{PA}$ then prefer oscillator injection=A; and
if $\hat{C}F_2^{PA} > \hat{C}F_2^{MO}$ then prefer amplifier injection=A'.

113. The apparatus of claim 109 further comprising:
the cost function comprising:
if bandwidth>a selected limit then prefer oscillator injection=B; and
if bandwidth<a selected limit then prefer oscillator injection=C.

114. The apparatus of claim 110 further comprising:
the cost function comprising:
if bandwidth>a selected limit then prefer oscillator injection=B; and
if bandwidth<a selected limit then prefer oscillator injection=C.

115. The apparatus of claim 111 further comprising:
the cost function comprising:
if bandwidth>a selected limit then prefer oscillator injection=B; and
if bandwidth<a selected limit then prefer oscillator injection=C.

116. The apparatus of claim 112 further comprising:
the cost function comprising:
if bandwidth>a selected limit then prefer oscillator injection=B; and
if bandwidth<a selected limit then prefer oscillator injection=C.

117. The apparatus of claim 113 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

118. The apparatus of claim 114 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

119. The apparatus of claim 115 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

120. The apparatus of claim 116 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

121. The apparatus of claim 117 further comprising:
A=A'<B<D<C<E.

122. The apparatus of claim 118 further comprising:
A=A'<B<D<C<E.

123. The apparatus of claim 119 further comprising:
A=A'<B<D<C<E.

124. The apparatus of claim 120 further comprising:
A=A'<B<D<C<E.

125. The apparatus of claim 121 further comprising:
the fluorine injection controller implements a fluorine injection by executing a formula having an input comprising the weighted injection decision determination with the highest score.

126. The apparatus of claim 122 further comprising:
the fluorine injection controller implements a fluorine injection by executing a formula having an input comprising the weighted injection decision determination with the highest score.

127. The apparatus of claim 123 further comprising:
the fluorine injection controller implements a fluorine injection by executing a formula having an input comprising the weighted injection decision determination with the highest score.

128. The apparatus of claim 124 further comprising:
the fluorine injection controller implements a fluorine injection by executing a formula having an input comprising the weighted injection decision determination with the highest score.

129. A multi-chambered excimer or molecular halogen gas discharge laser system comprising at least one oscillator chamber and at least one amplifier chamber producing oscillator output laser light pulses that are amplified in the at least one power chamber, having a fluorine injection control system comprising:
a halogen gas consumption estimator means for:
estimating the amount of halogen gas that has been consumed in one of the at least one oscillator and at least one amplifier chamber by executing a formula having an input comprising the difference between an operating parameter of the at least one oscillator chamber and the at least one amplifier chamber, and
estimating the amount of halogen gas that has been consumed in the other of the at least one oscillator chamber and amplifier chamber, and
producing an output representative of an estimated halogen gas consumption in the at least one oscillator chamber and in the at least one amplifier chamber.

130. The apparatus of claim 129 further comprising:
a halogen gas injection controller means for determining the amount of halogen gas injection for the at least one oscillator chamber and the at least one amplifier chamber by executing a formula having inputs comprising the estimated halogen gas consumption outputs from the halogen gas consumption estimator means and a cost function comprising a plurality of weighted injection decision determinations.

131. The apparatus of claim 129 further comprising:
the halogen gas is fluorine.

132. The apparatus of claim 130 further comprising:
the halogen gas is fluorine.

133. The apparatus of claim 129 further comprising:
the operating parameter is the timing of the gas discharge in the respective ones of the at least one oscillator chamber and the at least one amplifier chamber.

134. The apparatus of claim 130 further comprising:
the operating parameter is the timing of the gas discharge in the respective ones of the at least one oscillator chamber and the at least one amplifier chamber.

135. The apparatus of claim 131 further comprising:
the operating parameter is the timing of the gas discharge in the respective ones of the at least one oscillator chamber and the at least one amplifier chamber.

136. The apparatus of claim 132 further comprising:
the operating parameter is the timing of the gas discharge in the respective ones of the at least one oscillator chamber and the at least one amplifier chamber.

137. A multi-chambered excimer or molecular halogen gas discharge laser system comprising at least one oscillator chamber and at least one amplifier chamber producing oscillator output laser light pulses that are amplified in the at least one amplifier chamber, having a fluorine injection control system comprising:
a halogen gas consumption estimator means for:
estimating the amount of halogen gas that has been consumed in one of the at least one oscillator and at least one amplifier chamber by executing a formula having an input comprising an operating parameter of the other of the at least one oscillator chamber and the at least one amplifier chamber, and
estimating the amount of halogen gas that has been consumed in the other of the at least one oscillator chamber and amplifier chamber, and
producing an output representative of an estimated halogen gas consumption in the at least one oscillator chamber and in the at least one amplifier chamber.

138. The apparatus of claim 137 further comprising:
a halogen gas injection controller means for determining the amount of halogen gas injection for the at least one oscillator chamber and the at least one amplifier chamber by executing a formula having inputs comprising the estimated halogen gas consumption outputs from the halogen gas consumption estimator means and a cost function comprising a plurality of weighted injection decision determinations.

139. The apparatus of claim 137 further comprising:
the halogen gas is fluorine.

140. The apparatus of claim 138 further comprising:
the halogen gas is fluorine.

141. The apparatus of claim 137 further comprising:
the operating parameter is E95.

142. The apparatus of claim 138 further comprising:
the operating parameter is E95.

143. The apparatus of claim 139 further comprising:
the operating parameter is E95.

144. The apparatus of claim 140 further comprising:
the operating parameter is E95.

145. A multi-chambered excimer or molecular halogen gas discharge laser system comprising at least one oscillator chamber and at least one amplifier chamber producing oscillator output laser light pulses that are amplified in the at least one amplifier chamber, having a fluorine injection control system comprising:
a halogen gas consumption estimator means for estimating the amount of halogen gas that has been consumed in each of the at least one oscillator chamber and the at least one amplifier chamber, by executing a formula having inputs comprising at least one parameter indicative of an amount of halogen gas consumption in the at least one oscillator chamber and at least one parameter indicative of an amount of halogen gas consumption in the at least one amplifier chamber and producing an output representative of the halogen gas consumption of the at least one oscillator chamber and an output representative of the halogen gas consumption of the at least one amplifier chamber.

146. The apparatus of claim 145 further comprising:
a halogen gas injection controller means for determining the amount of a halogen gas injection for the at least one oscillator chamber and the at least one amplifier chamber by executing a formula having inputs comprising the estimated halogen gas consumption outputs from the halogen gas consumption estimator means and a cost function comprising a plurality of weighted injection decision determinations.

147. The apparatus of claim 145 further comprising:
the halogen gas is fluorine.

148. The apparatus of claim 146 further comprising:
the halogen gas is fluorine.

149. The apparatus of claim 145 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and
the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

150. The apparatus of claim 146 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and
the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

151. The apparatus of claim 147 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

152. The apparatus of claim 148 further comprising:

the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

153. The apparatus of claim 149 further comprising:

the cost function comprising a decision having a first weighting factor to inject halogen gas into the at least one oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

154. The apparatus of claim 150 further comprising:

the cost function comprising a decision having a first weighting factor to inject halogen gas into the at least one oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

155. The apparatus of claim 151 further comprising:

the cost function comprising a decision having a first weighting factor to inject halogen gas into the at least one oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

156. The apparatus of claim 152 further comprising:

the cost function comprising a decision having a first weighting factor to inject halogen gas into the at least one oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

157. The apparatus of claim 153 further comprising:

the other weighted injection decision determinations are selected from the group of whether the bandwidth is out of specification high or low within a range of bandwidths and whether the voltage is out of specification, high or low, within a range of voltages.

158. The apparatus of claim 154 further comprising:

the other weighted injection decision determinations relating to fluorine injection into the at least one amplifier chamber are selected from the group comprising whether the voltage is out of specification high or low within a range of voltages.

159. The apparatus of claim 155 further comprising:

the other weighted injection decision determinations relating to fluorine injection into the at least one amplifier chamber are selected from the group comprising whether the voltage is out of specification high or low within a range of voltages.

160. The apparatus of claim 156 further comprising:

the other weighted injection decision determinations relating to fluorine injection into the at least one amplifier chamber are selected from the group comprising whether the voltage is out of specification high or low within a range of voltages.

161. The apparatus of claim 97 further comprising:

the estimating of the halogen gas consumption by executing a formula having an input comprising a measured change in an operating parameter correlated to an empirically determined change in halogen gas content in a respective one of the oscillator chamber and the amplifier chamber.

162. The apparatus of claim 98 further comprising:

the estimating of the halogen gas consumption by executing a formula having an input comprising a measured change in an operating parameter correlated to an empirically determined change in halogen gas content in a respective one of the oscillator chamber and the amplifier chamber.

163. The apparatus of claim 99 further comprising:

the estimating of the halogen gas consumption by executing a formula having an input comprising a measured change in an operating parameter correlated to an empirically determined change in halogen gas content in a respective one of the oscillator chamber and the amplifier chamber.

164. The apparatus of claim 100 further comprising:

the estimating of the halogen gas consumption by executing a formula having an input comprising a measured change in an operating parameter correlated to an empirically determined change in halogen gas content in a respective one of the oscillator chamber and the amplifier chamber.

165. The apparatus of claim 161 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

166. The apparatus of claim 162 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising measured change in a third operating parameter correlated to an empirically determined change in halogen gas content in the at least one amplifier chamber and a measured change in a fourth operating parameter correlated to an empirically determined change in halogen gas content in the at least one amplifier chamber.

167. The apparatus of claim 163 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

168. The apparatus of claim 164 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

169. The apparatus of claim 129 further comprising:

the estimating of the halogen gas consumption by executing a formula having an input comprising a measured change in an operating parameter correlated to an empirically determined change in halogen gas content in a respective one of the oscillator chamber and the amplifier chamber.

170. The apparatus of claim 130 further comprising:

the estimating of the halogen gas consumption by executing a formula having an input comprising a measured change in an operating parameter correlated to an empirically determined change in halogen gas content in a respective one of the oscillator chamber and the amplifier chamber.

171. The apparatus of claim 131 further comprising:

the estimating of the halogen gas consumption by executing a formula having an input comprising a measured change in an operating parameter correlated to an empirically determined change in halogen gas content in a respective one of the oscillator chamber and the amplifier chamber.

172. The apparatus of claim 132 further comprising:

the estimating of the halogen gas consumption by executing a formula having an input comprising a measured change in an operating parameter correlated to an empirically determined change in halogen gas content in a respective one of the oscillator chamber and the amplifier chamber.

173. The apparatus of claim 169 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

174. The apparatus of claim 170 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

175. The apparatus of claim 171 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

176. The apparatus of claim 172 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

177. The apparatus of claim 137 further comprising:
the estimating of the halogen gas consumption by executing a formula having an input comprising a measured change in an operating parameter correlated to an empirically determined change in halogen gas content in a respective one of the oscillator chamber and the amplifier chamber.

178. The apparatus of claim 138 further comprising:
the estimating of the halogen gas consumption by executing a formula having an input comprising a measured change in an operating parameter correlated to an empirically determined change in halogen gas content in a respective one of the oscillator chamber and the amplifier chamber.

179. The apparatus of claim 139 further comprising:
the estimating of the halogen gas consumption by executing a formula having an input comprising a measured change in an operating parameter correlated to an empirically determined change in halogen gas content in a respective one of the oscillator chamber and the amplifier chamber.

180. The apparatus of claim 140 further comprising:
the estimating of the halogen gas consumption by executing a formula having an input comprising a measured change in an operating parameter correlated to an empirically determined change in halogen gas content in a respective one of the oscillator chamber and the amplifier chamber.

181. The apparatus of claim 177 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

182. The apparatus of claim 178 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

183. The apparatus of claim 179 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

184. The apparatus of claim 180 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

185. The apparatus of claim 145 further comprising:
the estimating of the halogen gas consumption by executing a formula having an input comprising a measured change in an operating parameter correlated to an empirically determined change in halogen gas content in a respective one of the oscillator chamber and the amplifier chamber.

186. The apparatus of claim 146 further comprising:
the estimating of the halogen gas consumption by executing a formula having an input comprising a measured change in an operating parameter correlated to an empirically determined change in halogen gas content in a respective one of the oscillator chamber and the amplifier chamber.

187. The apparatus of claim 147 further comprising:
the estimating of the halogen gas consumption by executing a formula having an input comprising a measured change in an operating parameter correlated to an empirically determined change in halogen gas content in a respective one of the oscillator chamber and the amplifier chamber.

188. The apparatus of claim 148 further comprising:
the estimating of the halogen gas consumption by executing a formula having an input comprising a measured change in an operating parameter correlated to an empirically determined change in halogen gas content in a respective one of the oscillator chamber and the amplifier chamber.

189. The apparatus of claim 185 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

190. The apparatus of claim 186 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

191. The apparatus of claim 187 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

192. The apparatus of claim 188 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

193. A method using a multi-chambered excimer or molecular halogen gas discharge laser system comprising at least one oscillator chamber and at least one amplifier chamber for producing oscillator output laser light pulses that are amplified in the at least one amplifier chamber, having a fluorine injection control system comprising:
using a halogen gas consumption estimator:
estimating the amount of halogen gas that has been consumed in one of the at least one oscillator chamber by executing a formula having inputs comprising at least a first operating parameter of one of the least one oscillator chamber and the at least one amplifier chamber, and
the difference between a second operating parameter of the at least one oscillator chamber and the at least one amplifier chamber, and
estimating the amount of halogen gas that has been consumed in the other of the at least one oscillator chamber and the at least one amplifier chamber by executing a formula having an input comprising at least a third operating parameter of the other of the at least one oscillator chamber and the at least one amplifier chamber, and
producing an output representative of an estimated halogen gas consumption in the at least one oscillator chamber and of the halogen gas consumption in the at least one amplifier chamber.

194. The method of claim 193 further comprising:
using a halogen gas injection controller, determining the amount of halogen gas injection for the at least one oscillator chamber and the at least one amplifier chamber by executing a formula having inputs comprising the estimated halogen gas consumption outputs from the halogen gas consumption estimator means and a cost function comprising a plurality of weighted injection decision determinations.

195. The method of claim 193 further comprising:
the first operating parameter is the bandwidth of the output pulses of the at least one amplifier chamber;
the second operating parameter is representative of the time of firing of the gas discharges in the at least one oscillator chamber and the at least one amplifier chamber;
the third operating parameter is the energy of the output pulses of the at least one oscillator chamber.

196. The method of claim 194 further comprising:
the first operating parameter is the bandwidth of the output pulses of the at least one amplifier chamber;
the second operating parameter is representative of the time of firing of the gas discharges in the at least one oscillator chamber and the at least one amplifier chamber;
the third operating parameter is the energy of the output pulses of the at least one oscillator chamber.

197. The method of claim 193 further comprising:
the halogen gas is fluorine.

198. The method of claim 194 further comprising:
the halogen gas is fluorine.

199. The method of claim 195 further comprising:
the halogen gas is fluorine.

200. The method of claim 196 further comprising:
the halogen gas is fluorine.

201. The method of claim 197 further comprising:
the step of estimating the fluorine consumption in the at least one oscillator chamber carries out the formula:

$$\alpha \hat{C}F_2^{MO}(dtMOPA)+(1-\alpha)\hat{C}F_2^{MO}(E95)=\hat{C}F_2^{MO} \text{ and}$$

the step of estimating the fluorine consumption in the at least one amplifier chamber is carries out the formula:

$$\alpha \hat{C}F_2^{PA}(V)+(1-\alpha)\hat{C}F_2^{PA}(E_{MO})=\hat{C}F_2^{PA}.$$

202. The method of claim 198 further comprising:
the step of estimating the fluorine consumption in the at least one oscillator chamber carries out the formula:

$$\alpha \hat{C}F_2^{MO}(dtMOPA)+(1-\alpha)\hat{C}F_2^{MO}(E95)\hat{C}F_2^{MO} \text{ and}$$

the step of estimating the fluorine consumption in the at least one amplifier chamber is carries out the formula:

$$\alpha \hat{C}F_2^{PA}(V)+(1-\alpha)\hat{C}F_2^{PA}(E_{MO})=\hat{C}F_2^{PA}.$$

203. The method of claim 199 further comprising:
the step of estimating the fluorine consumption in the at least one oscillator chamber carries out the formula:

$$\alpha \hat{C}F_2^{MO}(dtMOPA)+(1-\alpha)\hat{C}F_2^{MO}(E95)\hat{C}F_2^{MO} \text{ and}$$

the step of estimating the fluorine consumption in the at least one amplifier chamber is carries out the formula:

$$\alpha \hat{C}F_2^{PA}(V)+(1-\alpha)\hat{C}F_2^{PA}(E_{MO})=\hat{C}F_2^{PA}.$$

204. The method of claim 200 further comprising:
the step of estimating the fluorine consumption in the at least one oscillator chamber carries out the formula:

$$\alpha \hat{C}F_2^{MO}(dtMOPA)+(1-\alpha)\hat{C}F_2^{MO}(E95)=\hat{C}F_2^{MO} \text{ and}$$

the step of estimating the fluorine consumption in the at least one amplifier chamber is carries out the formula:
$\alpha \hat{C}F_2^{PA}(V)+(1-\alpha)\hat{C}F_2^{PA}(E_{MO})=\hat{C}F_2^{PA}.$

205. The method of claim 201 further comprising:
the cost function comprising:
if $\hat{C}F_2^{MO}>\hat{C}F_2^{PA}$ then prefer oscillator injection=A; and
if $\hat{C}F_2^{PA}>\hat{C}F_2^{MO}$ then prefer amplifier injection=A'.

206. The method of claim 202 further comprising:
the cost function comprising:
if $\hat{C}F_2^{MO}>\hat{C}F_2^{PA}$ then prefer oscillator injection=A; and
if $\hat{C}F_2^{PA}>\hat{C}F_2^{MO}$ then prefer amplifier injection=A'.

207. The method of claim 203 further comprising:
the cost function comprising:
if $\hat{C}F_2^{MO}>\hat{C}F_2^{PA}$ then prefer oscillator injection=A; and
if $\hat{C}F_2^{PA}>\hat{C}F_2^{MO}$ then prefer amplifier injection=A'.

208. The method of claim 204 further comprising:
the cost function comprising:
if $\hat{C}F_2^{MO}>\hat{C}F_2^{PA}$ then prefer oscillator injection=A; and
if $\hat{C}F_2^{PA}>\hat{C}F_2^{MO}$ then prefer amplifier injection=A'.

209. The method of claim 205 further comprising:
the cost function comprising:
if bandwidth>a selected limit then prefer oscillator injection=B; and
if bandwidth<a selected limit then prefer oscillator injection=C.

210. The method of claim 206 further comprising:
the cost function comprising:
if bandwidth>a selected limit then prefer oscillator injection=B; and
if bandwidth<a selected limit then prefer oscillator injection=C.

211. The method of claim 207 further comprising:
the cost function comprising:
if bandwidth>a selected limit then prefer oscillator injection=B; and
if bandwidth<a selected limit then prefer oscillator injection=C.

212. The method of claim 208 further comprising:
the cost function comprising:
if bandwidth>a selected limit then prefer oscillator injection=B; and
if bandwidth<a selected limit then prefer oscillator injection=C.

213. The method of claim 209 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

214. The method of claim 210 further comprising:
the cost function comprising:
if voltage supplied to the at least one amplifier chamber>a selected limit then prefer amplifier injection=D; and if voltage supplied to the at least one amplifier chamber<a selected limit then prefer amplifier injection=E.

215. The method of claim 211 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

216. The method of claim 212 further comprising:
the cost function comprising:
if voltage supplied to the at least one amplifier chamber>a selected limit then prefer amplifier injection=D; and
if voltage supplied to the at least one amplifier chamber<a selected limit then prefer amplifier injection=E.

217. The method of claim 213 further comprising:
A=A'<B<D<C<E.

218. The method of claim 214 further comprising:
A=A'<B<D<C<E.

219. The method of claim 215 further comprising:
A=A'<B<D<C<E.

220. The method of claim 216 further comprising:
A=A'<B<D<C<E.

221. The method of claim 217 further comprising:
the fluorine injection controller implements a fluorine injection by executing a formula having an input comprising the weighted injection decision determination with the highest score.

222. The method of claim 218 further comprising:
the fluorine injection controller implements a fluorine injection by executing a formula having an input comprising the weighted injection decision determination with the highest score.

223. The method of claim 219 further comprising:
the fluorine injection controller implements a fluorine injection by executing a formula having an input comprising the weighted injection decision determination with the highest score.

224. The method of claim 220 further comprising:
the fluorine injection controller implements a fluorine injection by executing a formula having an input comprising the weighted injection decision determination with the highest score.

225. A method using multi-chambered excimer or molecular halogen gas discharge laser system comprising at least one oscillator chamber and at least one amplifier chamber for producing oscillator output laser light pulses that are amplified in the at least one power chamber, having a fluorine injection control system comprising:
using a halogen gas consumption estimator:
estimating the amount of halogen gas that has been consumed in one of the at least one oscillator and at least one amplifier chamber by executing a formula having an input comprising the difference between an operating parameter of the at least one oscillator chamber and the at least one amplifier chamber, and
estimating the amount of halogen gas that has been consumed in the other of the at least one oscillator chamber and amplifier chamber, and
producing an output representative of an estimated halogen gas consumption in the at least one oscillator chamber and in the at least one amplifier chamber.

226. The method of claim 225 further comprising:
using a halogen gas injection controller, determining the amount of halogen gas injection for the at least one oscillator chamber and the at least one amplifier chamber by executing a formula having inputs comprising the estimated halogen gas consumption outputs from the halogen gas consumption estimator means and a cost function comprising a plurality of weighted injection decision determinations.

227. The method of claim 226 further comprising:
the halogen gas is fluorine.

228. The method of claim 227 further comprising:
the halogen gas is fluorine.

229. The method of claim 225 further comprising:
the operating parameter is the timing of the gas discharge in the respective ones of the at least one oscillator chamber and the at least one amplifier chamber.

230. The method of claim 226 further comprising:
the operating parameter is the timing of the gas discharge in the respective ones of the at least one oscillator chamber and the at least one amplifier chamber.

231. The method of claim 227 further comprising:
the operating parameter is the timing of the gas discharge in the respective ones of the at least one oscillator chamber and the at least one amplifier chamber.

232. The method of claim 228 further comprising:
the operating parameter is the timing of the gas discharge in the respective ones of the at least one oscillator chamber and the at least one amplifier chamber.

233. A method using a multi-chambered excimer or molecular halogen gas discharge laser system comprising at least one oscillator chamber and at least one amplifier chamber for producing oscillator output laser light pulses that are amplified in the at least one amplifier chamber, having a fluorine injection control system comprising:
using a halogen gas consumption estimator:
estimating the amount of halogen gas that has been consumed in one of the at least one oscillator and at least one amplifier chamber by executing a formula having an input comprising an operating parameter of the other of the at least one oscillator chamber and the at least one amplifier chamber, and
estimating the amount of halogen gas that has been consumed in the other of the at least one oscillator chamber and amplifier chamber, and
producing an output representative of an estimated halogen gas consumption in the at least one oscillator chamber and in the at least one amplifier chamber.

234. The method of claim 233 further comprising:
using a halogen gas injection controller, determining the amount of halogen gas injection for the at least one oscillator chamber and the at least one amplifier chamber by executing a formula having inputs comprising the estimated halogen gas consumption outputs from the halogen gas consumption estimator means and a cost function comprising a plurality of weighted injection decision determinations.

235. The method of claim 233 further comprising:
the halogen gas is fluorine.

236. The method of claim 234 further comprising:
the halogen gas is fluorine.

237. The method of claim 233 further comprising:
the operating parameter is E95.

238. The method of claim 234 further comprising:
the operating parameter is E95.

239. The method of claim 235 further comprising:
the operating parameter is E95.

240. The method of claim 236 further comprising:
the operating parameter is E95.

241. A method using a multi-chambered excimer or molecular halogen gas discharge laser system comprising at least one oscillator chamber and at least one amplifier chamber for producing oscillator output laser light pulses that are amplified in the at least one amplifier chamber, having a fluorine injection control system comprising:

using a halogen gas consumption estimator, estimating the amount of halogen gas that has been consumed in each of the at least one oscillator chamber and the at least one amplifier chamber, by executing a formula having inputs comprising at least one parameter indicative of an amount of halogen gas consumption in the at least one oscillator chamber and at least one parameter indicative of an amount of halogen gas consumption in the at least one amplifier chamber, and producing an output representative of the halogen gas consumption of the at least one oscillator chamber and an output representative of the halogen gas consumption of the at least one amplifier chamber.

242. The method of claim 241 further comprising:

using a halogen gas injection controller, determining the amount of a halogen gas injection for the at least one oscillator chamber and the at least one amplifier chamber by executing a formula having inputs comprising the estimated halogen gas consumption outputs from the halogen gas consumption estimator means and a cost function comprising a plurality of weighted injection decision determinations.

243. The method of claim 241 further comprising:
the halogen gas is fluorine.

244. The method of claim 242 further comprising:
the halogen gas is fluorine.

245. The method of claim 241 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

246. The method of claim 242 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

247. The method of claim 243 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

248. The method of claim 244 further comprising:
the at least one operating parameter indicative of the halogen gas consumption in the at least one oscillator chamber is at least two operating parameters, the first of which is a difference in an operating parameter of the at least one oscillator chamber and the at least one amplifier chamber, and the second of which is an operating parameter of the at least one amplifier chamber, and the at least one operating parameter indicative of the halogen gas consumption in the at least one amplifier chamber is at least two operating parameters one of which is an operating parameter of the at least one oscillator chamber and one of which is an operating parameter of the at least one amplifier chamber.

249. The method of claim 245 further comprising:
the cost function comprising a decision having a first weighting factor to inject halogen gas into the at least one oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

250. The method of claim 246 further comprising:
the cost function comprising a decision having a first weighting factor to inject halogen gas into the at least one oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

251. The method of claim 247 further comprising:
the cost function comprising a decision having a first weighting factor to inject halogen gas into the at least one oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

252. The method of claim 248 further comprising:
the cost function comprising a decision having a first weighting factor to inject halogen gas into the at least one oscillator chamber if the estimation of the halogen gas consumption in the at least one oscillator chamber exceeds the estimation of the halogen gas consumption in the at least one amplifier chamber and a decision having a second weighting factor to inject halogen gas into the at least one amplifier chamber if the estimate of the halogen gas consumption in the at least one amplifier chamber exceeds the estimate of the halogen gas consumption in the at least one oscillator chamber, unless there exists another weighted injection decision determination with a higher weighting factor.

253. The method of claim 249 further comprising:

the other weighted injection decision determinations are selected from the group of whether the bandwidth is out of specification high or low within a range of bandwidths and whether the voltage is out of specification, high or low, within a range of voltages.

254. The method of claim 250 further comprising:

the other weighted injection decision determinations relating to fluorine injection into the at least one amplifier chamber are selected from the group comprising whether the voltage is out of specification high or low within a range of voltages.

255. The method of claim 251 further comprising:

the other weighted injection decision determinations relating to fluorine injection into the at least one amplifier chamber are selected from the group comprising whether the voltage is out of specification high or low within a range of voltages.

256. The method of claim 252 further comprising:

the other weighted injection decision determinations relating to fluorine injection into the at least one amplifier chamber are selected from the group comprising whether the voltage is out of specification high or low within a range of voltages.

257. The method of claim 193 further comprising:

the estimating of the halogen gas consumption by executing a formula having an input comprising a measured change in an operating parameter correlated to an empirically determined change in halogen gas content in a respective one of the oscillator chamber and the amplifier chamber.

258. The method of claim 194 further comprising:

the estimating of the halogen gas consumption by executing a formula having an input comprising a measured change in an operating parameter correlated to an empirically determined change in halogen gas content in a respective one of the oscillator chamber and the amplifier chamber.

259. The method of claim 195 further comprising:

the estimating of the halogen gas consumption by executing a formula having an input comprising a measured change in an operating parameter correlated to an empirically determined change in halogen gas content in a respective one of the oscillator chamber and the amplifier chamber.

260. The method of claim 196 further comprising:

the estimating of the halogen gas consumption by executing a formula having an input comprising a measured change in an operating parameter correlated to an empirically determined change in halogen gas content in a respective one of the oscillator chamber and the amplifier chamber.

261. The method of claim 257 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

262. The method of claim 258 further comprising:

the estimating of the halogen gas consumption in the at least one oscillatory chamber is a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

263. The method of claim 259 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

264. The method of claim 260 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

265. The method of claim 225 further comprising:
the step of estimating of the halogen gas consumption by executing a formula having an input comprising a measured change in an operating parameter correlated to an empirically determined change in halogen gas content in a respective one of the oscillator chamber and the amplifier chamber.

266. The method of claim 226 further comprising:
the step of estimating of the halogen gas consumption by executing a formula having an input comprising a measured change in an operating parameter correlated to an empirically determined change in halogen gas content in a respective one of the oscillator chamber and the amplifier chamber.

267. The method of claim 227 further comprising:
the step of estimating of the halogen gas consumption by executing a formula having an input comprising a measured change in an operating parameter correlated to an empirically determined change in halogen gas content in a respective one of the oscillator chamber and the amplifier chamber.

268. The method of claim 228 further comprising:
the step of estimating of the halogen gas consumption by executing a formula having an input comprising a measured change in an operating parameter correlated to an empirically determined change in halogen gas content in a respective one of the oscillator chamber and the amplifier chamber.

269. The method of claim 265 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

270. The method of claim 266 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

271. The method of claim 267 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

272. The method of claim 268 further comprising:
the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and
the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

273. The method of claim 233 further comprising:
the estimating of the halogen gas consumption by executing a formula having an input comprising a measured change in an operating parameter correlated to an empirically determined change in halogen gas content in a respective one of the oscillator chamber and the amplifier chamber.

274. The method of claim 234 further comprising:
the estimating of the halogen gas consumption by executing a formula having an input comprising a measured change in an operating parameter correlated to an empirically determined change in halogen gas content in a respective one of the oscillator chamber and the amplifier chamber.

275. The method of claim 235 further comprising:
the estimating of the halogen gas consumption by executing a formula having an input comprising a measured change in an operating parameter correlated to an empirically determined change in halogen gas content in a respective one of the oscillator chamber and the amplifier chamber.

276. The method of claim 236 further comprising:
the estimating of the halogen gas consumption by executing a formula having an input comprising a measured change in an operating parameter correlated to an empirically determined change in halogen gas content in a respective one of the oscillator chamber and the amplifier chamber.

277. The method of claim 273 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

278. The method of claim 274 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

279. The method of claim 275 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

280. The method of claim 276 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

281. The method of claim 241 further comprising:

the estimating of the halogen gas consumption by executing a formula having an input comprising a measured change in an operating parameter correlated to an empirically determined change in halogen gas content in a respective one of the oscillator chamber and the amplifier chamber.

282. The method of claim 242 further comprising:

the estimating of the halogen gas consumption by executing a formula having an input comprising a measured change in an operating parameter correlated to an empirically determined change in halogen gas content in a respective one of the oscillator chamber and the amplifier chamber.

283. The method of claim 243 further comprising:

the estimating of the halogen gas consumption by executing a formula having an input comprising a measured change in an operating parameter correlated to an empirically determined change in halogen gas content in a respective one of the oscillator chamber and the amplifier chamber.

284. The method of claim 244 further comprising:

the estimating of the halogen gas consumption by executing a formula having an input comprising a measured change in an operating parameter correlated to an empirically determined change in halogen gas content in a respective one of the oscillator chamber and the amplifier chamber.

285. The method of claim 281 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

286. The method of claim 282 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

287. The method of claim 283 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

288. The method of claim 284 further comprising:

the estimating of the halogen gas consumption in the at least one oscillatory chamber by executing a formula having inputs comprising a measured change in a first operating parameter correlated to an empirically determined change in halogen gas content in the at least one oscillator chamber and a measured change in a second operating parameter correlated to an empirically determined change in halogen gas content in the at least one oscillator chamber, and the estimating of the halogen gas consumption in the at least one amplifier chamber by executing a formula having inputs comprising a measured change in a third operating parameter correlated to an empirically determined change in halogen gas content in the at least one amplifier chamber and a measured change in a fourth operating parameter correlated to an empirically determined change in halogen gas content in the at least one amplifier chamber.

* * * * *